US 8,768,012 B2
Jul. 1, 2014

(12) United States Patent
Satoh

(10) Patent No.: US 8,768,012 B2
(45) Date of Patent: *Jul. 1, 2014

(54) ROAD ESTIMATION DEVICE AND METHOD FOR ESTIMATING ROAD

(75) Inventor: Taichi Satoh, Kariya (JP)

(73) Assignee: DENSO CORPORATION, Kariya (JP)

(*) Notice: Subject to any disclaimer, the term of this patent is extended or adjusted under 35 U.S.C. 154(b) by 273 days.

This patent is subject to a terminal disclaimer.

(21) Appl. No.: 13/301,845

(22) Filed: Nov. 22, 2011

(65) Prior Publication Data

US 2012/0130634 A1 May 24, 2012

(30) Foreign Application Priority Data

| Nov. 24, 2010 | (JP) | ................................. | 2010-261387 |
| Nov. 24, 2010 | (JP) | ................................. | 2010-261388 |
| Jan. 12, 2011 | (JP) | ................................... | 2011-4119 |
| Mar. 9, 2011 | (JP) | ................................. | 2011-51764 |
| Mar. 9, 2011 | (JP) | ................................. | 2011-51765 |
| Jun. 2, 2011 | (JP) | ................................ | 2011-124211 |

(51) Int. Cl.
*G06K 9/00* (2006.01)

(52) U.S. Cl.
USPC .......................................................... 382/113

(58) Field of Classification Search
None
See application file for complete search history.

(56) References Cited

U.S. PATENT DOCUMENTS

| 5,790,973 | A | * | 8/1998 | Blaker et al. ............... 455/456.5 |
| 2004/0039524 | A1 | | 2/2004 | Adachi | |
| 2004/0212627 | A1 | | 10/2004 | Sumizawa et al. | |
| 2005/0131642 | A1 | | 6/2005 | Adachi | |
| 2008/0051971 | A1 | | 2/2008 | Sung | |
| 2008/0208459 | A1 | | 8/2008 | Takahata et al. | |
| 2012/0128213 | A1 | * | 5/2012 | Satoh ............................ 382/113 |
| 2012/0128214 | A1 | * | 5/2012 | Satoh ............................ 382/113 |
| 2012/0128215 | A1 | * | 5/2012 | Satoh ............................ 382/113 |
| 2012/0128216 | A1 | * | 5/2012 | Satoh ............................ 382/113 |
| 2012/0128217 | A1 | * | 5/2012 | Satoh ............................ 382/113 |

FOREIGN PATENT DOCUMENTS

| JP | A-9-160483 | 6/1997 |
| JP | A-2004-354395 | 12/2004 |
| JP | A-2006-275777 | 10/2006 |
| JP | A-2009-270953 | 11/2009 |
| JP | A-2009-300405 | 12/2009 |
| JP | A-2010-32243 | 2/2010 |
| JP | A-2011-75345 | 4/2011 |

OTHER PUBLICATIONS

Office Action mailed Feb. 19, 2013 in corresponding JP Application No. 2011-051765 (and English translation).
U.S. Appl. No. 13/301,815, filed Nov. 22, 2011, Satoh.

(Continued)

*Primary Examiner* — Stephen R Koziol
*Assistant Examiner* — Amandeep Saini
(74) *Attorney, Agent, or Firm* — Posz Law Group, PLC

(57) ABSTRACT

A road estimation device receives data including core points assigned along a road and assigned with attributes for identifying the road. An input unit inputs map data including links in a unit of a divided region being one of divided areas. When the core points cross a boundary of an indicated divided region to be indicated, a selection unit selects a processing object core point inside the indicated divided region from the core points in the map data. An extraction unit extracts candidate links being candidate of a road represented by the processing object core point from the map data according to attributes of the links and the attribute of the processing object core point for estimating the road on a map.

18 Claims, 25 Drawing Sheets

(56) References Cited

OTHER PUBLICATIONS

U.S. Appl. No. 13/301,822, filed Nov. 22, 2011, Satoh.
U.S. Appl. No. 13/301,825, filed Nov. 22, 2011, Satoh.
U.S. Appl. No. 13/301,830, filed Nov. 22, 2011, Satoh.
U.S. Appl. No. 13/301,834, filed Nov. 22, 2011, Satoh.
Office Action dated Oct. 25, 2013 in corresponding U.S. Appl. No. 13/301,815.
Office Action dated Dec. 3, 2013 issued in corresponding CN Application No. 201110378308.6 (and English translation).
Office Action dated Nov. 14, 2013 in corresponding CN Application No. 201110378053.3 (with English translation).
Office Action dated Dec. 3, 2013 in corresponding U.S. Appl. No. 13/301,834.
Office Action dated Dec. 3, 2013 in corresponding U.S. Appl. No. 13/301,825.
Office Action dated Dec. 31, 2013 issued in corresponding CN Application No. 201110378314.1 (and English translation).

\* cited by examiner

FIG. 4

| LATITUDE | LATITUDE OF CP |
|---|---|
| LONGITUDE | LONGITUDE OF CP |
| IP FLAG | CP IS INTERSECTION OR NOT |
| VIRTUAL CP FLAG | CP IS VIRTUAL CP OR NOT |
| ATTRIBUTE FC (NON-SHAPE) | ROAD CLASSIFICATION |
| ATTRIBUTE FW (NON-SHAPE) | PHYSICAL ROAD TYPE |
| ATTRIBUTE RD (NON-SHAPE) | ROAD NUMBER OR ROAD OFFICIAL NAME (5 LETTERS MAX) |
| ATTRIBUTE IT (NON-SHAPE) | CLASSIFICATION OF INTERSECTION |
| ATTRIBUTE RDI (NON-SHAPE) | NAME OF INTERSECTION |
| ATTRIBUTE DD (NON-SHAPE) | LEGALLY PERMITTED DRIVE DIRECTION |
| ATTRIBUTE AFR (NON-SHAPE) | DD IS REFERABLE OR NOT |
| ATTRIBUTE BR (SHAPE) | GEOLOGICAL ANGLE TO SUBSEQUENT CP |
| ATTRIBUTE DMB (SHAPE) | LINEAR DISTANCE TO SUBSEQUENT CP |
| ATTRIBUTE CA (SHAPE) | ANGLE TO SIDE ROAD |
| ATTRIBUTE DCA (SHAPE) | CONNECTION DISTANCE TO SIDE ROAD |
| ATTRIBUTE PCI (SHAPE) | DRIVEWAY NUMBER AMONG MULTIPLE DRIVEWAYS |
| ATTRIBUTE PDM (SHAPE) | DISTANT DEGREE FROM LINE CONNECTING TO SUBSEQUENT CP |
| ATTRIBUTE PD (SHAPE) | DRIVE DISTANCE TO SUBSEQUENT CP WITH PD |

FIG. 5

| FC VALUE | FC CONTENT |
|---|---|
| 0 | MAIN ROAD |
| 1 | FIRST CLASS ROAD |
| 2 | SECOND CLASS ROAD |
| 3 | THIRD CLASS ROAD |
| 4 | FOURTH CLASS ROAD |
| 5 | FIFTH CLASS ROAD |
| 6 | SIXTH CLASS ROAD |
| 7 | SEVENTH CLASS ROAD |
| 8 | EIGHTH CLASS ROAD |
| 9 | NINTH CLASS ROAD |

FIG. 6

| FW VALUE | FW CONTENT |
|---|---|
| 0 | UNCLEAR |
| 1 | HIGHWAY |
| 2 | MULTIPLE DRIVEWAYS (NOT HIGHWAY) |
| 3 | SINGLE DRIVEWAY |
| 4 | ROTARY |
| 5 | TRAFFIC SQUARE |
| 6 | SURROUNDED TRAFFIC AREA |
| 7 | BYPASS |
| 8 | FEEDER ROAD |
| 9 | PARKING ENTRANCE / EXIT |
| 10 | SERVICE AREA ENTRANCE / EXIT |
| 11 | PEDESTRIAN ZONE |
| 12 | PASSAGE |

FIG. 7

| IT VALUE | IT CONTENT |
|---|---|
| 0 | UNDEFINED |
| 1 | HIGHWAY OR INTERCHANGE OF LIMITED ROAD |
| 2 | ROTARY |
| 3 | COMPLICATED INTERSECTION (NOT 1, 2) |
| 4 | SIMPLE INTERSECTION |
| 5 | TRAFFIC SQUARE |
| 6 | TWO-VALUE INTERSECTION |

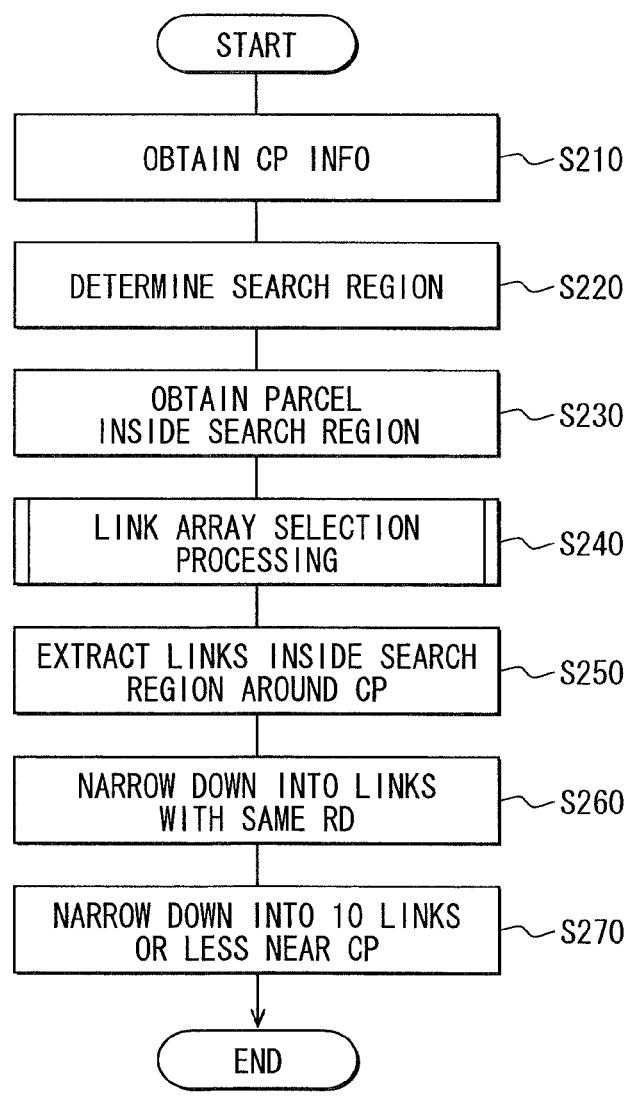

| PDM/r | CORRECTION VALUE |
|---|---|
| 0.1 OR LESS | 0.6 |
| 1 | 1.0 |
| 4 | 2.7 |
| 8 | 5.2 |
| 16 | 10.3 |
| 32 | 20.4 |

ROAD ESTIMATION DEVICE AND METHOD FOR ESTIMATING ROAD

CROSS REFERENCE TO RELATED APPLICATIONS

This application is based on and claims priority to Japanese Patent Applications No. 2010-261387 filed on Nov. 24, 2010, No. 2010-261388 filed on Nov. 24, 2010, No. 2011-4119 filed on Jan. 12, 2011, No. 2011-51764 filed on Mar. 9, 2011, No. 2011-51765 filed on Mar. 9, 2011, and No. 2011-124211 filed on Jun. 2, 2011 the contents of which are incorporated in their entirely herein by reference.

FIELD OF THE INVENTION

The present invention relates to a road estimation device configured to extract a link corresponding to a road represented by core points each including an attribute for identifying the road on a map. The present invention further relates to a method for estimating a road represented by the core points.

BACKGROUND OF THE INVENTION

The vehicle information and communication system (VICS) is known as a conventional service for broadcasting traffic information. The present service is implemented to provide various kinds of traffic information and vehicle information to a user. For example, the VICS Center is caused to transmit traffic information, such as traffic congestion information about the road, to a vehicle. In addition, a vehicular device is caused to search map data for identifying a road. Furthermore, a display device is caused to change a display mode of a road according to the received traffic information. The present service enables a user to obtain traffic information such as traffic congestion information in real time.

An in-vehicle device stores map data including road data in a format defined with links and nodes. A link represents a road having nodes being termination points. The VICS Center transmits the VICS Link being information for identifying roads. The VICS link is assigned with various traffic information and change instruction information on a display mode. An in-vehicle device has a position reference table for comparing the VICS Link with links in the map data. The in-vehicle device searches a link corresponding to the VICS Link with reference to the table. That is, the position reference table is requisite for the VICS system (see, for example, JP-A-2006-275777 and JP-A-2009-270953).

As an alternative service to the VICS system, it is conceived to utilize data of traffic information transmitted in the form of transport protocol expert group (TPEG) to a terminal device such as a vehicular device. It is noted that in the case of TPEG data being transmitted, position information is represented in the form of, for example, dynamic location referencing data (DLR data). The position information includes core points each having position coordinates and attributes for identifying a road. In general, the core point is distributed in the form of multiple arrays arranged along the road. In the system where the core points are used to represent position information, a position reference table, which may vary in dependence upon difference in manufacturer of the map data, the format and the version of the map data, and the like, is unnecessary. That is, the system using the core points enables identification of a road (link) on the map data, regardless of the map data in the in-vehicle device.

To the contrary, the system using the core points needs various processings for identifying a road according to the core points. For example, as described above, various kinds of map data exist. Therefore, core points do not necessarily exist on a road of map data. Therefore, it is necessary to implement a processing (identification processing) to identify a link pertinent to a road represented by core points on a map.

The map data is inputted in the unit of the divided region being one of multiple areas being divided. The divided region is called a parcel. For example, when a map is indicated, processings are implemented in the unit of the divided region.

Core points being distributed are multiple arrays arranged along a road. In general, core points are located beyond the boundary of the divided region of the map data. For example, when implementing an identification processing around the boundary, it is important determination of a processing object to include specific core point(s) to the divided region being an indicated object for facilitation of the processing or for securing accuracy of the identification.

SUMMARY OF THE INVENTION

In view of the foregoing and other problems, it is an object of the present invention to produce a road estimation device configured to select appropriately a core point(s) as a processing object to a divided region in map data from information on the core point being distributed. It is another object to produce a method for estimating a road represented by the core point(s).

According to an aspect of the present invention, a road estimation device configured to receive data including a plurality of core points from an external object, the core points being assigned along a road and being respectively assigned with attributes for identifying the road, the road estimation device further configured to extract links pertinent to the road represented by the core points for estimating the road on a map, the road estimation device comprises a map data input unit configured to input map data including links in a unit of a divided region being one of a plurality of divided areas, the links respectively having attributes corresponding to attributes of the core points. The road estimation device further comprises a core point selection unit configured to, when the core points cross a boundary of an indicated divided region, which is a divided region being an indicated object, select, as a processing object core point, a core point inside the indicated divided region from the core points in the map data which the map data input unit inputs. The road estimation device further comprises a link extraction unit configured to extract candidate links being candidate of a road represented by the processing object core point from the map data according to the attributes of the links and the attribute of the processing object core point.

According to another aspect of the present invention, a road estimation device configured to receive data including a plurality of core points from an external object, the core points being assigned along a road and being respectively assigned with attributes for identifying the road, the road estimation device further configured to extract links pertinent to the road represented by the core points for estimating the road on a map, the road estimation device comprises a map data input unit configured to input map data including links in a unit of a divided region being one of a plurality of divided areas, the links respectively having attributes corresponding to attributes of the core points. The road estimation device further comprises a core point selection unit configured to, when the core points cross a boundary of an indicated divided region, which is a divided region being an indicated object, select, as a processing object core point, a core point to an immediately-after-crossing-boundary core point, in addition to a core point inside the indicated divided region, from the core points in the map data which the map data input unit inputs. The immediately-after-crossing-boundary core point is a core point immediately after crossing the boundary from an inside of the indicated divided region to an outside of the indicated divided region. The road estimation device further comprises a link extraction unit configured to extract candidate links being candidate of a road represented by the processing object core point from the map data according to the attributes of the links and the attribute of the processing object core point.

According to another aspect of the present invention, a road estimation device configured to receive data including a plurality of core points from an external object, the core points being assigned along a road and being respectively assigned with attributes for identifying the road, the road estimation device further configured to extract links pertinent to the road represented by the core points for estimating the road on a map, the road estimation device comprises a map data input unit configured to input map data including links in a unit of a divided region being one of a plurality of divided areas, the links respectively having attributes corresponding to attributes of the core points. The road estimation device further comprises a core point selection unit configured to, when the core points cross a boundary of an indicated divided region, which is a divided region being an indicated object, compare a distance, which is from the boundary to an immediately-after-crossing-boundary core point, with a distance, which is from the boundary to an immediately-before-crossing-boundary core point, in the map data which the map data input unit inputs. The immediately-after-crossing-boundary core point is a core point immediately after crossing the boundary from an inside of the indicated divided region to an outside of the indicated divided region. The immediately-before-crossing-boundary core point is a core point immediately before crossing the boundary from the inside to the outside. The core point selection unit is further configured to, when the distance to the immediately-after-crossing-boundary core point is greater, select, as the processing object core point, a core point located inside the indicated divided region and to the immediately-before-crossing-boundary core point. The core point selection unit is further configured to, when the distance to the immediately-before-crossing-boundary core point is greater, select, as the processing object core point, a core point to the immediately-after-crossing-boundary core point, in addition to a core point located inside the indicated divided region. The road estimation device further comprises a link extraction unit configured to extract candidate links being candidate of a road represented by the processing object core point from the map data according to the attributes of the links and the attribute of the processing object core point.

According to another aspect of the present invention, a method for estimating a road, the method comprises receiving data including a plurality of core points from an external object, the core points being assigned along a road and assigned respectively with attributes for identifying the road. The method further comprises inputting map data including links in a unit of a divided region being one of a plurality of divided areas, the links respectively having attributes corresponding to attributes of the core points. The method further comprises selecting, when the core points cross a boundary of an indicated divided region, which is a divided region being an indicated object, a processing object core point being a core point inside the indicated divided region from the core points in the inputted map data. The method further comprises extracting candidate links being candidate of a road represented by the processing object core point from the map data according to the attributes of the links and the attribute of the processing object core point.

According to another aspect of the present invention, a method for estimating a road, the method comprises receiving data including a plurality of core points from an external object, the core points being assigned along a road and assigned respectively with attributes for identifying the road. The method further comprises inputting map data including links in a unit of a divided region being one of a plurality of divided areas, the links respectively having attributes corresponding to attributes of the core points. The method further comprises selecting, when the core points cross a boundary of an indicated divided region, which is a divided region being an indicated object, a processing object core point including a core point to an immediately-after-crossing-boundary core point in addition to a core point inside the indicated divided region, from the core points in the inputted map data, wherein the immediately-after-crossing-boundary core point is a core point immediately after crossing the boundary from an inside of the indicated divided region to an outside of the indicated divided region. The method further comprises extracting candidate links being candidate of a road represented by the processing object core point from the map data according to the attributes of the links and the attribute of the processing object core point.

According to another aspect of the present invention, a method for estimating a road, the method comprises receiving data including a plurality of core points from an external object, the core points being assigned along a road and assigned respectively with attributes for identifying the road. The method further comprises inputting map data including links in a unit of a divided region being one of a plurality of divided areas, the links respectively having attributes corresponding to attributes of the core points. The method further comprises comparing, when the core points cross a boundary of an indicated divided region, which is a divided region being an indicated object, a distance, which is from the boundary to an immediately-after-crossing-boundary core point, with a distance, which is from the boundary to an immediately-before-crossing-boundary core point, in the inputted map data. The immediately-after-crossing-boundary core point is a core point immediately after crossing the boundary from an inside of the indicated divided region to an outside of the indicated divided region. The immediately-before-crossing-boundary core point is a core point immediately before crossing the boundary from the inside to the outside. The method further comprises selecting, as a processing object core point, a core point located inside the indicated divided region and to the immediately-before-crossing-boundary core point, when the distance to the immediately-after-crossing-boundary core point is greater. The method further comprises selecting, as the processing object core point, a core point to the immediately-after-crossing-boundary core point, in addition to a core point located inside the indicated divided region, when the distance to the immediately-before-crossing-boundary core point is greater. The method further comprises extracting candidate links being candidate of a road represented by the processing object core point from the map data according to the attributes of the links and the attribute of the processing object core point.

BRIEF DESCRIPTION OF THE DRAWINGS

The above and other objects, features and advantages of the present invention will become more apparent from the following detailed description made with reference to the accompanying drawings. In the drawings:

FIG. 4 is an explanatory view showing attributes of a CP after conversion;

FIG. 5 is an explanatory view showing values of an attribute FC and associated contents;

FIG. 6 is an explanatory view showing values of an attribute FW and associated contents;

FIG. 7 is an explanatory view showing values of an attribute IT and associated contents;

FIG. 11 is an explanatory view showing a determination rule of an attribute PCI;

FIG. 12 is a flow chart showing a candidate link search processing in the matching processing;

DETAILED DESCRIPTION OF PREFERRED EMBODIMENTS

Embodiment

As follows, embodiments will be described with reference to drawings.

<1. Configuration of Navigation Device>

The configuration of a navigation device will be first described with reference to FIG. 1. A navigation device 10 shown in FIG. 1 may function as a road estimation device. Specifically, the navigation device 10 is configured to receive transport protocol expert group data (TPEG data), to implement matching of a road based on position information contained in the data, and to implement indication of traffic information transmitted with position information correspondingly to the road.

Figure 1:
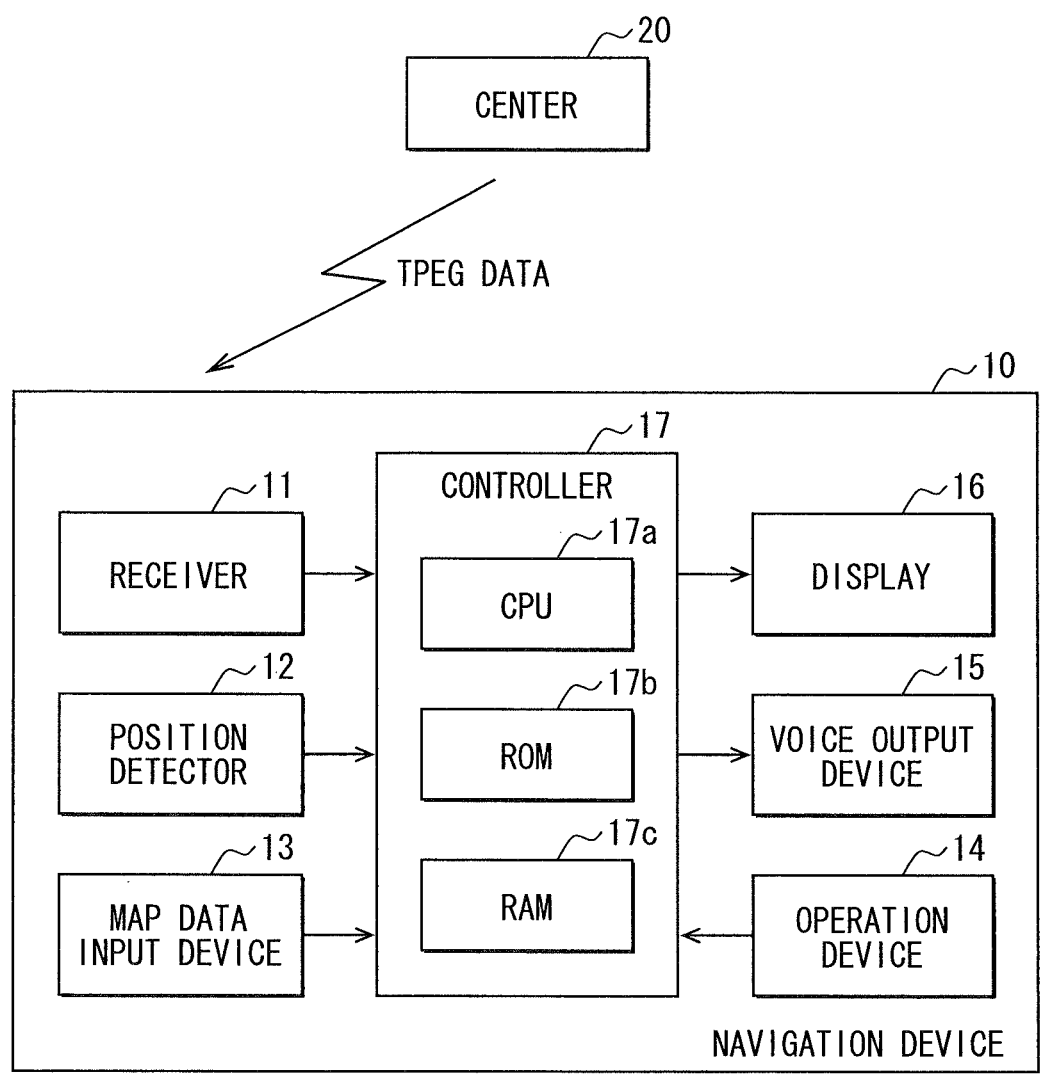
FIG. 1 is a block diagram showing a configuration of a navigation device.

The navigation device 10 shown in FIG. 1 includes a receiver device 11, a position sensing device 12, a map data input device 13, an operation device 14, a voice output device 15, an indication device 16, and a control circuit 17.

The receiver device 11 is for receiving the TPEG data from a center 20. The navigation device 10 causes the control circuit 17 to implement tuning thereby to obtain the TPEG data through the receiver device 11.

The position sensing device 12 is for detecting the present position of the vehicle equipped with the navigation device 10. The position sensing device 12 includes various devices such as a generally-known gyroscope, a distance sensor, and/or a GPS receiver.

The map data input device 13 includes a storage medium such as a hard disk and/or a DVD device storing map data. The map data input device 13 is configured to input map data stored in the storage medium into the control circuit 17. The map data input device 13 may include a DVD drive in addition to the hard disk storing the map data. With the map data input device 13, the navigation device 10 is configured to install additional data of the map data into the hard disk. The additional data may be an optional supply and may be sold as a DVD medium. The map data is managed in a unit of parcel and cashed in the unit of the parcel.

The operation device 14 is for enabling a user to input an instruction into the control circuit 17. The operation device 14 may include a touch panel located at the indication device 16, an operation switch group equipped on the surface of a main body of the navigation device 10, and/or in a remote controller, and/or the like. The user is enabled to implement various operations of the navigation device 10, such as a destination determining operation, a scale change operation of the map, and/or a scrolling operation of the map, via the operation device 14.

The voice output device 15 includes an audio device such as a speaker for outputting a guidance voice and/or the like to a user, in response to a signal from the control circuit 17. The indication device 16 has a full color indication function. The indication device 16 is configured to overlap traffic information, which is generated based on the TPEG data obtained by the receiver device 11, on a map image generated based on the map data received from the map data input device 13.

The control circuit 17 has a configuration similar to a generally-known microcomputer and includes components, such as a CPU 17*a*, a ROM 17*b*, a RAM 17*c*, an I/O device, and a bus line connecting the components. The CPU 17*a* implements various operations according to the program stored in the ROM 17*b*. The receiver device 11 may receive the TPEG data including information such as the position information being dynamic location referencing data (DLR data). The control circuit 17 estimates a pertinent road in the map data based on the position information.

<2. Function of Control Circuit>

Figure 2:
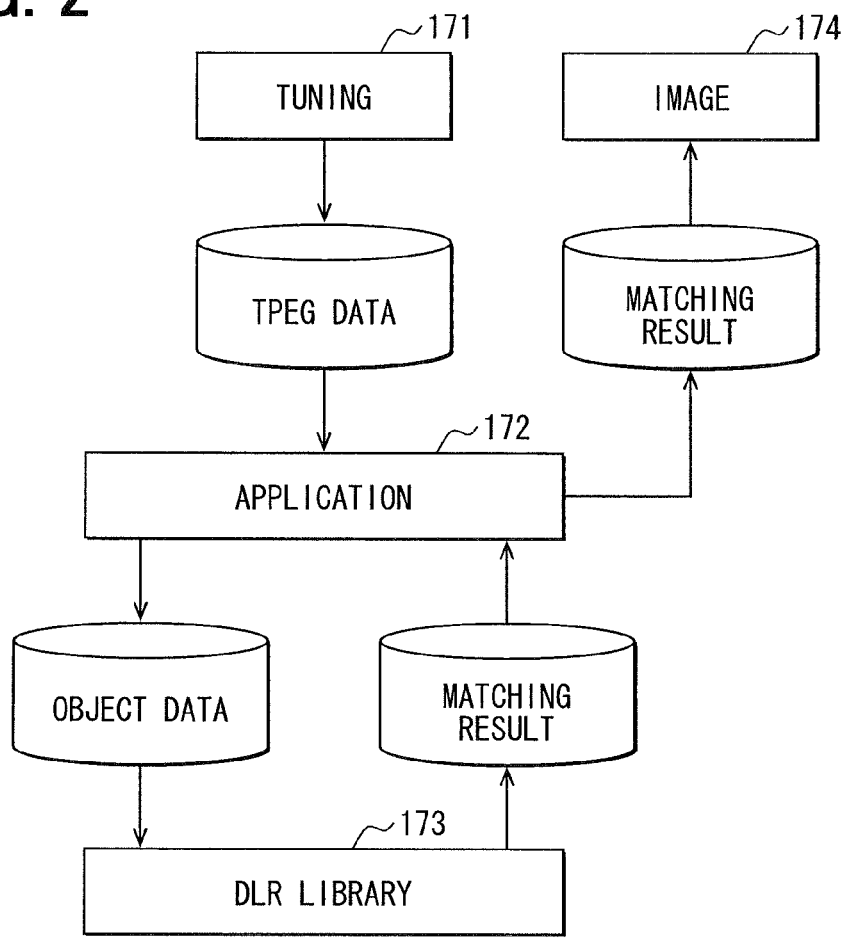
FIG. 2 is a functional block diagram showing an operation of a control circuit.

Subsequently, the function of the control circuit 17 related to processings of the TPEG data will be described with reference to FIG. 2. FIG. 2 is an explanatory view showing the function of the control circuit 17.

The function of the control circuit 17 is categorized into a tuning block 171, an application block 172, a DLR library block 173, and an image block 174. The tuning block 171 is configured to receive the TPEG data via the receiver device 11. That is, the tuning block 171 has the above-described tuning function. The tuning block 171 sends the received TPEG data to the application block 172.

The application block 172 is a function produced by an application program. The application program is stored in the ROM 17*b* and executed by the CPU 17*a*.

The application block 172 manages the TPEG data sent from the tuning block 171 and updates the TPEG data when receiving new TPEG data. The application block 172 further includes information for identifying a parcel (object parcel) being an indicated object to be indicated on the screen. The screen may include a single object parcel or may include multiple object parcels such as nine object parcels, in dependence on a scale size. The application block 172 sends information on the object parcel and position information of TPEG data as object data to the DLR library block 173.

The DLR library block 173 is a function produced by a DLR library program. Similarly to the application program, the DLR library program is stored in the ROM 17*b* and executed by the CPU 17*a*.

The DLR library block 173 executes a matching processing described later. The matching processing is implemented to estimate a pertinent road (link) in the map data inputted from the map data input device 13 according to the position information of the TPEG data. In advance of the matching processing, the DLR library block 173 reads the map data from the map data input device 13 into the RAM 17*c* on request caused by the application block 172. The DLR library block 173 sends the result of the matching processing as a matching result to the application block 172.

The application block 172 manages the matching result. Further, the image block 174 implements map update based on the matching result. Thus, as described above, the traffic information based on the TPEG data is overlapped on the map image based on the map data inputted from the map data input device 13.

<3. Matching Processing>

Figure 3:
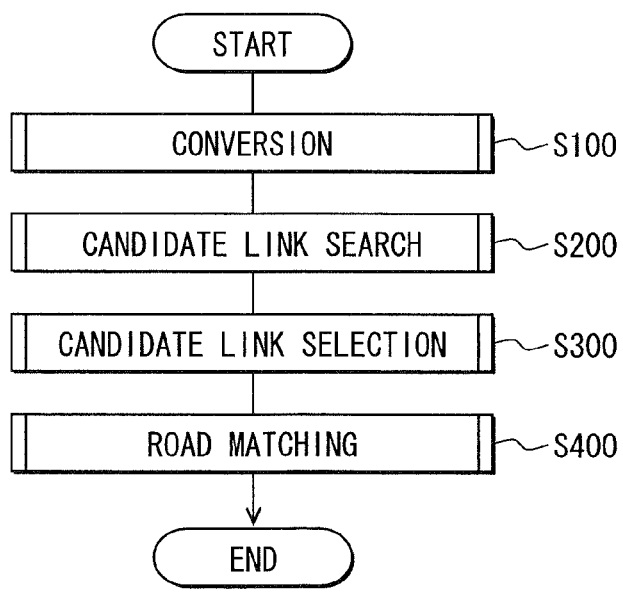
FIG. 3 is a flow chart showing a matching processing.

As described above, the DLR library block 173 is configured to implement the matching processing. As follows, the matching processing will be described. FIG. 3 is a flow chart showing the matching processing.

At S100, a conversion processing is implemented. The conversion processing is implemented to convert the position information (binary data) as DLR of the TPEG data into intermediate data. As already stated, discrete points are mainly used as the position information of the TPEG data. These discrete points are core points (CPs). The CPs have various attributes. In the present configuration, attributes necessary for the road estimation processing are retrieved to generate intermediate data.

<3.1 Attributes of Converted CPs>

FIG. 4 shows attributes included in the CPs converted into the intermediate data. In general, multiple CPs are transmitted as the position information of the TPEG data. Therefore, the CPs are managed as data array. The position may be estimated based on a single CP. In this case, a single CP may be transmitted.

Referring to FIG. 4, the CP includes the latitude, the longitude, an IP flag, and a virtual CP flag fundamental attributes. The latitude is the coordinates representing the latitude of the CP, and the longitude is the coordinates representing the longitude of the CP. The IP flag represents whether the CP is an intersection. The IP flag is set at 1 when the CP represents an intersection, and the IP flag is set at 0 otherwise. The virtual CP flag represents whether the CP is a virtual CP. The virtual CP flag is set at 1 when the CP represents a virtual CP, and the virtual CP flag is set at 0 otherwise. The virtual CP will be described later.

The CP includes various attributes about a road, which connects CPs. The attribute is categorized into a shape-relevant attribute related to a road shape and a non-shape-relevant attribute, which is not related to a road shape. First, the non-shape-relevant attribute will be described.

<3.1.1 Non-Shape-Relevant Attribute>

An attribute FC represents a road classification. As shown by the example of FIG. 5, a road is classified into ten levels including 0 to 9 levels. The number 0 represents a main road, the number 1 represents the first class road, and the number 2 represents the second class road. Similarly, the road is classified into levels from the third class road represented by 3 to the ninth class road represented by 9. For example, the main road is connected to a country or a capital, and the first class road is a national highway connecting major cities therebetween.

An attribute FW represents a physical road type. As shown by one example of FIG. 6, the physical road type is classified into thirteen categories including 0 to 13. In FIG. 6, 0 represents unclear, 1 represents a highway, 2 represents multiple-lane driveway excluding a highway, 3 represents a single-lane driveway, 4 represents a rotary, 5 represents a traffic square, 6 represents a surrounded traffic area, 7 represents a bypass, 8 represents a feeder road, 9 represents an inlet or an outlet of a parking space, 10 represents an inlet or an outlet of a service area, 11 represents a pedestrian zone, and 12 represents a passage.

An attribute RD represents an RD value being the route number, if a road is assigned with the route number. For example, the RD value may represent a national route number, such as "1" in a case where the road is the route 1. When the route number does not exist, a road name is assigned as the RD value. Referring to FIG. 4, the road name includes five characters of a formal name at maximum.

In FIG. 4, an attribute IT represents the classification (intersection classification) of an intersection. As shown by one example of FIG. 7, the intersection classification is classified into seven categories including 0 to 6. In FIG. 7, 0 represents undefined, 1 represents a highway or a speed-limited interchange, 2 represents a rotary, 3 represents a complicated intersection other than the categories of 1 and 2, 4 represents a simple intersection, 5 represents a traffic square, and 6 represents a two-value intersection where a route number or a road name changes.

In FIG. 4, an attribute RDI represents the name of an intersection. In FIG. 4, an attribute DD represents a legally-permitted driving direction. For example, 0 represents that legally-permitted driving direction is undefined, 1 represents that legally-permitted driving direction is the forward direction, 2 represents that legally-permitted driving direction is the backward direction, and 3 represents that legally-permitted driving direction is both directions. An attribute AFR is a flag, which represents whether the attribute DD is referable. The attribute AFR is set at 1 when the attribute DD has a value of one of 0 to 3. Otherwise, the attribute AFR is set at 0 to represent that the attribute DD is non-referable when the attribute DD does not have a value.

<3.1.2 Shape-Relevant Attribute>

Subsequently, the shape-relevant attribute will be described. In FIG. 4, an attribute BR represents the geographical angle to the subsequent CP. As described above, multiple CPs are, in general, managed as data arrays. The attribute BR represents a value being the angle in the clockwise direction relative to the north direction.

In FIG. 4, an attribute DMB represents the linear distance to the subsequent CP. Similarly to the attribute BR, the attribute DMB represents a value of the linear distance to the subsequent CP, since the subsequent CP exists in general.

An attribute CA represents the angle relative to a side road. The side road is a minor road, which is not assigned with a route number. When a side road exists, the attribute CA is assigned to represent a value being the angle to the side road. The attribute CA is a positive value when the side road is in the clockwise direction with respect to the angle of the attribute BR, and is a negative value when the side road is in the counterclockwise direction with respect to the angle of the attribute BR. An attribute DCA represents the connection distance to the side road.

That is, the attribute CA represents the direction of the vector from the CP, and the attribute DCA represents the volume of the vector from the CP. Therefore, the position coordinates are determined by the attribute CA and the attribute DCA. The position coordinates represent the point where the side road exists.

In FIG. 4, an attribute PCI represents one of driveways (roads) being selected when multiple driveways exist in the same direction. The attribute PCI includes the number of driveways and a sequence number representing the order of the object road in the driveways.

In FIG. 4, an attribute PDM represents the spaced distance by which the object road is spaced from a straight line connected to the subsequent CP. The spaced distance represents the maximum distance to the object road. In FIG. 4, an attribute PD represents the travel distance along the object road to the CP including the subsequent attribute PD.

Figure 8:
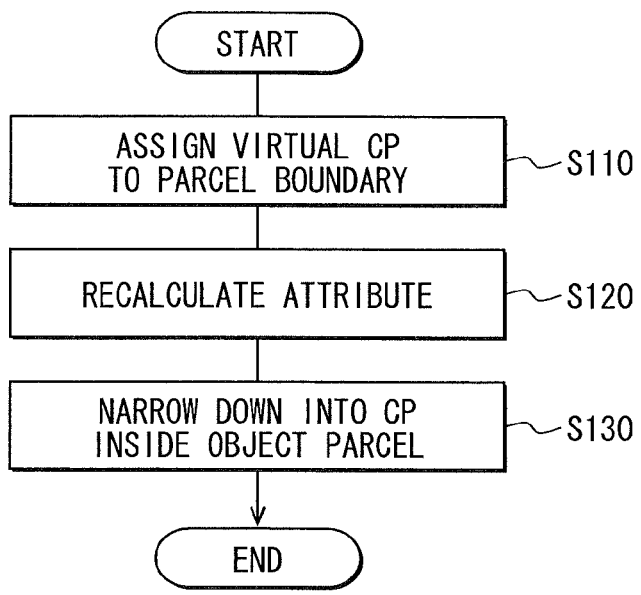
FIG. 8 is a flow chart showing a conversion processing in the matching processing.

As described above, the attributes of a CP being converted into intermediate data are described. In the conversion of the CP, the virtual CP is added, and recalculation of the attributes of the CP is implemented. FIG. 8 shows the detailed processing of the conversion.

<4. Detail of Matching Processing (First Half)>

Figure 9:
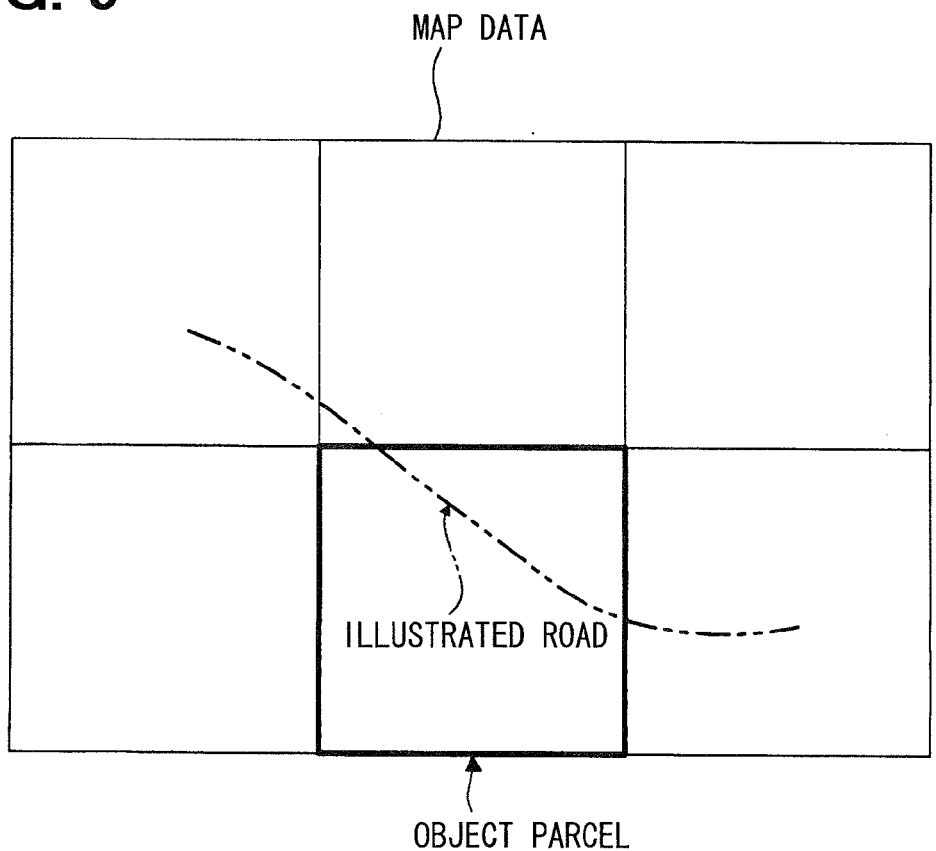
FIG. 9 is an explanatory view showing a road represented by CPs existing over an object parcel.

In FIG. 8, at S110, a virtual CP is assigned to a boundary of an object parcel. FIG. 9 is an explanatory view showing a two-dot chain line indicating a road shape represented by CPs for convenience. The object is to estimate such a road shape and to implement matching of the estimated road shape with a road represented by a link array of the map data. It is noted that the road shape indicated by the two-dot chain line in FIG. 9 is an example simplified for convenience of explanation and does not represent an actual road shape. The array of CPs may be within an object parcel. Otherwise, it is further noted that, as shown in FIG. 9, the array of CPs may extend beyond the object parcel to a parcel around the object parcel. In such a case, a virtual CP is assigned to the boundary of the object parcel.

Figure 10A:
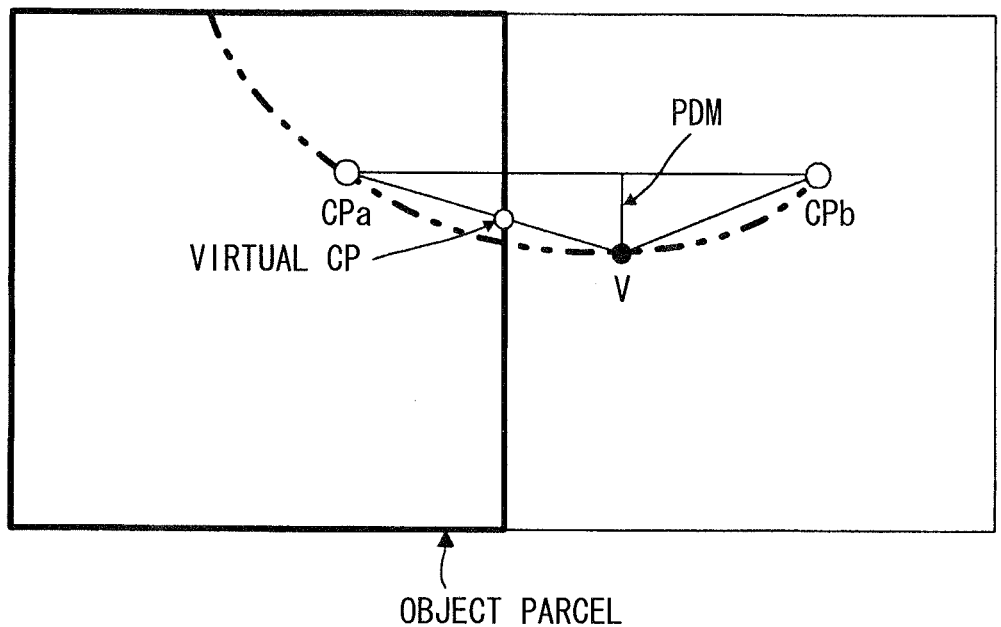
FIGS. 10A, 10B are explanatory views showing assignment of a virtual CP and a processing in a parcel boundary.

Specifically, FIG. 10A shows a case where two CPa and CPb are located through the boundary of the object parcel. In such a case, a peak V of the road shape can be derived from the value of the attribute PDM. In addition, a line segment, which connects the peak V of the road shape with the CPa, and a line segment, which connects the peak V with the CPb, are also derived. Thus, the virtual CP is assigned to the intersection between one of the line segments and the boundary of the object parcel.

As follows, the CPs are represented as CPa, CPb, CPc, and the like by adding symbols a, b, c and the like in order to distinguish multiple CPs.

<4.1 Recalculation of Attributes>

At subsequent S120, the attributes of CPs are recalculated. Since the virtual CP is assigned, the CP on the end side (end-side CP) is excluded from CPs to be processed (described later). In the example of FIG. 10A, the CPb on the end side is excluded from CPs to be processed. Therefore, the attributes of the CP on the start side (start-side CP) and the attributes of the virtual CP are recalculated. In the example of FIG. 10A, the attributes of the CPa and the attributes of the virtual CP are recalculated. The attributes to be recalculated include the attribute BR, the attribute DMB, the attribute PCI, the attribute CA, the attribute DCA, the attribute PDM, and the attribute PD.

Referring to FIG. 4, the attribute BR and the attribute DMB respectively represent the angle relative to the subsequent CP and the linear distance from the subsequent CP. Therefore, the angle relative to the subsequent CP and the linear distance from the subsequent CP including the newly assigned virtual CP are calculated and set.

The attribute CA and the attribute DCA of the CP on the start side are not recalculated. In the example of FIG. 10A, the attribute CA and the attribute DCA of the CPa are not recalculated. The attribute CA and the attribute DCA of the virtual CP are set at invalid values. The processing is implemented in this manner, since the attribute CA and the attribute DCA are related with a side road, and such information on a side road is not applicable to the virtual CP.

Referring to FIG. 4, the attribute PCI is related to the number of driveways (roads, lanes) extending in parallel. Therefore, the attribute PCI of the CP on the start side is not recalculated. In the example of FIG. 10A, the attribute PCI of the CPa is not recalculated. The attribute PCI of the virtual CP is set in accordance with the attributes PCI of the CPs on the start side and on the end side. In the example of FIG. 10A, the attribute PCI of the virtual CP is set in accordance with the attributes PCI of the CPa and the CPb.

FIG. 11 shows a detailed calculation rule of the attribute PCI of the virtual CP. When the CP on the start side and the CP on the end side respectively have the attributes PCI and when the attributes PCI of both the CPs coincide with each other, the attribute PCI of the virtual CP is set at the same value of the attributes PCI of both the CPs. Otherwise, when the attributes PCI of both the CPs do not coincide with each other, the attribute PCI of the virtual CP is set at an invalid value.

When one of the CP on the start side and the CP on the end side has the attribute PCI and when the virtual CP is located in the vicinity of the CP, which has the attribute PCI, the attribute PCI of the virtual CP is set at the value of the attribute PCI of the one CP. Otherwise, when one of the CP on the start side and the CP on the end side has the attribute PCI and when the virtual CP is not located in the vicinity of the CP, which has the attribute PCI, the attribute PCI of the virtual CP is set at an invalid value. In the present cases, the virtual CP is determined to be located in the vicinity of the CP having the attribute PCI when, for example, the linear distance from the virtual CP to the CP having the attribute PCI is 10% or less of the linear distance between the CP on the start side and the CP on the end side.

Otherwise, when both the CP on the start side and the CP on the end side do not have the attribute PCI, the attribute PCI of the virtual CP is set at an invalid value.

In FIG. 4, the attribute PDM represents the spaced distance by which the object road is spaced from the straight line connected to the subsequent CP. The value of the attribute PDM before being assigned with the virtual CP is multiplied by a correction value to set the attribute PDM. Specifically, a divisional rate of the virtual CP is calculated, and a correction value is calculated by using the subsequent formula.

(i) When the divisional rate is less than 50%, correction value=0.6×divisional rate/100 (Formula 1)

(ii) When the divisional rate is greater than or equal to 50%, correction value=1.4×divisional rate/100−0.4 (Formula 2)

The divisional rate is calculated by using the subsequent formula.

The divisional rate, when the attribute PDM of the CP on the start side is recalculated, is:

linear distance between start-side CP and virtual CP/total linear distance between start-side CP and end-side CP (Formula 3)

The divisional rate, when the attribute PDM of the virtual CP is recalculated, is:

linear distance between virtual CP and end-side CP/total linear distance between start-side CP and end-side CP (Formula 4)

The total linear distance is the summation of the linear distances of the linear paths from the CP on the start side to the CP on the end side through the virtual CP. That is, the total linear distance is the summation of the linear distance between the CP on the start side and the virtual CP and the linear distance between the virtual CP and the CP on the end side.

Referring to FIG. 4, the attribute PD is the travel distance to the subsequent CP having the attribute PD and is not necessarily assigned to all the CPs. Therefore, two CPs located beyond a parcel boundary may not have the attribute PD. Therefore, recalculation is implemented using one of CPs having the attribute PD and closest to the virtual CP. When a CP, which has the attribute PD, does not exist, recalculation of the attribute PD is not implemented.

In the recalculation of the attribute PD, the value of the attribute PD assigned to the CP is divided proportionally according to the linear distance to the virtual CP. That is, the value of the attribute PD of the CP is calculated by multiplying the original value of the attribute PD of the CP by the divisional rate calculated by using the formula 3. In addition, the value of the attribute PD of the virtual CP is calculated by multiplying the original value of the attribute PD of the CP on the start side by the divisional rate calculated by using the formula 4.

<4.2 Narrowing Down Processing of CPs>

Referring to FIG. 8, at S130, narrowing down processing of CPs within the object parcel is implemented. The present processing is implemented to set only the CPs including the virtual CP within the object parcel to obtain the processing object. It is conceivable that the array of the CPs may continue to cross beyond the boundary of the object parcel, nevertheless, it may suffice to implement matching to the object parcel, which is the indicated object of the application.

<4.2.1 Method for not Assigning Virtual CP>

In the above method, the virtual CP is assigned thereby to set the processing object in the range to the virtual CP on assumption that the CP exists in the boundary of the object parcel. Alternatively, as another embodiment, the processing may be implemented by using an original CP, which is included in the DLR data being provided, as a CP on the end side of an object parcel.

Figure 10B:
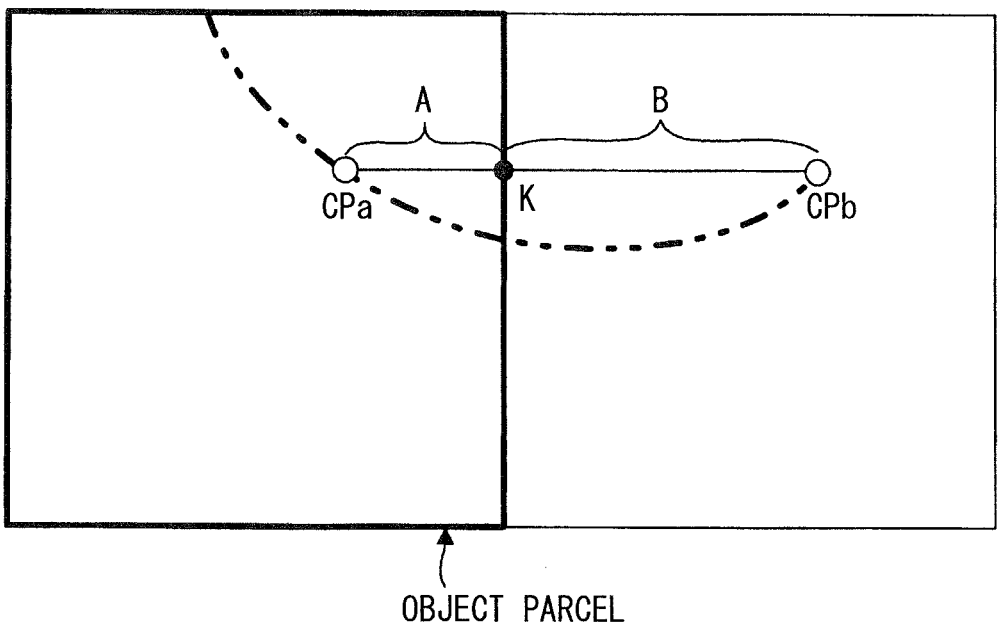

For example, as shown in FIG. 10B, in the case where the CPs extend the boundary of the object parcel, the CPa in the object parcel may be used as the CP on the end side. Alternatively, the CPb, which first appears outside the object parcel may be used as the CP on the end side. It is noted that the CPa and/or the CPb may be away from the boundary of the object parcel. In consideration of this, for example, one of the CPa and the CPb may be selected as the CP on the end side, according to distant degrees of the CPa and the CPb from the boundary of the object parcel.

<4.2.2 Other Embodiment (1)>

Figure 33:
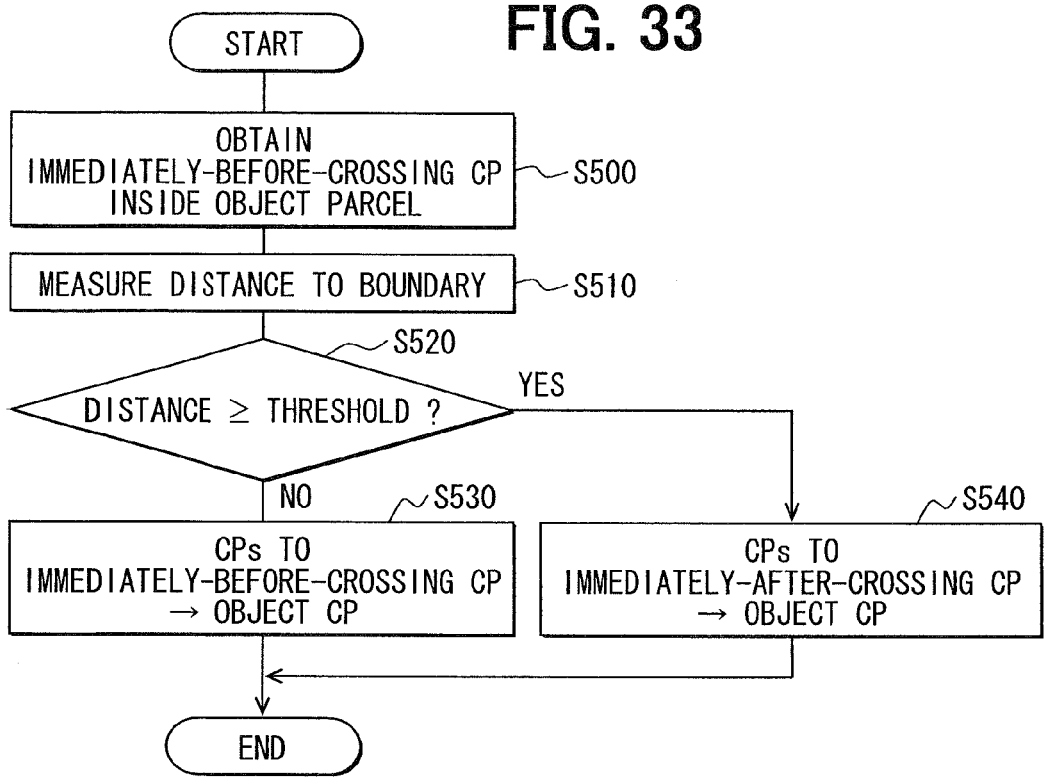
FIG. 33 is a flow chart showing a conversion processing according to other embodiment.

FIG. 33 shows a conversion processing according to other embodiment (1).

In the beginning, at S500, a CP (immediately-before-crossing-boundary CP) inside the boundary of the object parcel and immediately before crossing the boundary is retrieved. The immediately-before-crossing-boundary CP is, when a road represented by the CP extends from the object parcel to an outside parcel adjacent to the object parcel, the last CP, which is located in the object parcel, among CPs distributed to represent the road. That is, the immediately-before-crossing-boundary CP is the last CP, which is located in the object parcel, among the array of CPs.

At subsequent S510, the distance from the CP retrieved at S500 to the boundary of the object parcel is measured. As one example, as shown in FIG. 10B, it is conceived to calculate an intersection K between a straight line, which connects the CPa with the CPb, and the boundary of the object parcel and to measure the linear distance A to the intersection K.

At subsequent S520, it is determined whether the distance from the boundary of the object parcel to the immediately-before-crossing-boundary CP is greater than or equal to a predetermined distance. The predetermined distance may be set in consideration of an accuracy of road estimation close to the boundary of the object parcel. When the distance is determined to be less than the predetermined distance (S520: NO), at S530, the CP inside the object parcel is set as a processing object CP. Alternatively, when the distance is determined to be greater than or equal to the predetermined distance (S520: YES), at S540, CPs to the immediately-after-crossing-boundary CP, are set as the processing object CP, in addition to the CP inside the object parcel. The immediately-after-crossing-boundary CP is the first CP located outside the object parcel and distributed following the immediately-before-crossing-boundary CP.

In the determination processing at S520, the distance between the immediately-before-crossing-boundary CP and the boundary of the object parcel are used. It is noted that, the distance between the CP, which is located inside the object parcel and closest to the boundary of the object parcel, and the boundary of the object parcel may be used for the determination processing. This is since, when the distance is greater than a predetermined distance, the distance to the boundary of the immediately-before-crossing-boundary CP is naturally greater than the predetermined distance.

That is, when a negative determination is made at S520, it may be implemented by determining whether the distance to the immediately-before-crossing-boundary CP is less than the predetermined distance. On the other hand, when a positive determination is made at S520, it may be implemented by determining whether the distance to the immediately-before-crossing-boundary CP or the CP, which is located inside the boundary and closest to the boundary, is greater than or equal to the predetermined distance.

In the case of the CP on the end side shown in FIG. 10B, the CPa, which is inside the object parcel, is set as the CP on the end side normally at S530 in FIG. 33. In addition, when the linear distance A is greater than or equal to a predetermined value, the CPb outside the object parcel is set as the CP on the end side. In this example, the region defined by the CPa is the processing object normally, thereby to reduce the processing time as much as possible. For example, when the CPa is extremely away from the boundary of the object parcel and when the processing object is defined by the CPa as usual, a large number of candidate roads may exist, and consequently, road estimation accuracy may decrease. In consideration of this, in the present embodiment, the region defined by the CPb is set as the processing object, in this case. Therefore, accuracy of road estimation around the boundary of the object parcel can be enhanced. Thus, traffic information, such as traffic congestion information, can be sufficiently indicated.

<4.2.3 Other Embodiment (2)>

Figure 34:
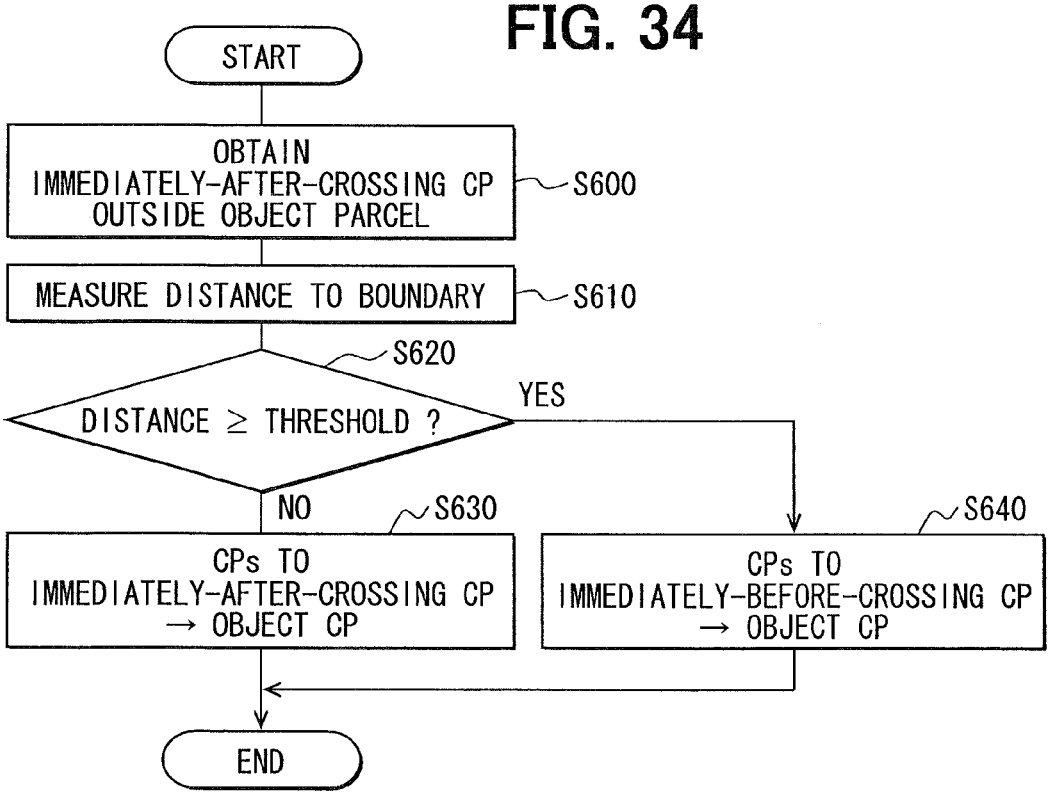
FIG. 34 is a flow chart showing a conversion processing according to other embodiment.

FIG. 34 shows a conversion processing according to other embodiment (2).

In the beginning, at S600, a CP (immediately-after-crossing-boundary CP) outside the boundary of the object parcel and immediately after crossing the boundary is retrieved. As described above, the immediately-after-crossing-boundary CP is, when a road represented by the CP extends from the object parcel to an outside parcel adjacent to the object parcel, the first CP, which is located outside the object parcel, among CPs distributed to represent the road. That is, the immediately-after-crossing-boundary CP is the first CP, which is located in the object parcel, among the array of CPs. At subsequent S610, the distance from the CP retrieved at S600 to the boundary of the object parcel is measured. As one example, as shown in FIG. 10B, it is conceived to calculate an intersection K between a straight line, which connects the CPa with the CPb, and the boundary of the object parcel and to measure the linear distance B to the intersection K.

At subsequent S620, it is determined whether the distance from the boundary of the object parcel to the immediately-after-crossing-boundary CP is greater than or equal to a predetermined distance. The predetermined distance may be determined in consideration of processing load for CPs (core points). When the distance is determined to be less than the predetermined distance (S620: NO), at S630, CPs to the immediately-after-crossing-boundary CP are set as the processing object CP, in addition to the CP inside the object parcel. When the distance is determined to be greater than or equal to the predetermined distance (S620: YES), the CP inside the object parcel is set as the processing object CP.

In the determination processing at S620, the distance between the immediately-after-crossing-boundary CP and the boundary of the object parcel are used. It is noted that, the distance between the CP, which is located outside the object parcel and closest to the boundary of the object parcel, and the boundary of the object parcel may be used for the determination processing. This is since, when the distance is greater than a predetermined distance, the distance to the boundary of the immediately-after-crossing-boundary CP is naturally greater than the predetermined distance.

That is, when a negative determination is made at S620, it may be implemented by determining whether the distance to the immediately-after-crossing-boundary CP is less than the predetermined distance. On the other hand, when a positive determination is made at S620, it may be implemented by determining whether the distance to the immediately-before-crossing-boundary CP or the CP, which is located outside the boundary and closest to the boundary, is greater than or equal to the predetermined distance.

In the case of the CP on the end side shown in FIG. 10B, the CPb, which is outside the object parcel, is set as the CP on the end side normally at S630 in FIG. 34. In addition, when the linear distance B is greater than or equal to a predetermined value, the CPa inside the object parcel is set as the CP on the end side. In this case, the region defined by the CPb is the processing object normally. Therefore, accuracy of road estimation around the boundary of the object parcel can be enhanced. Thus, traffic information, such as traffic congestion information, can be sufficiently indicated. In addition, when the CPb is extremely away from the boundary of the object parcel, for example, the region defined by the CPa is the processing object. Therefore, in this case, the processing time can be restricted from being too long.

<4.2.4 Other Embodiment (3)>

Figure 35:
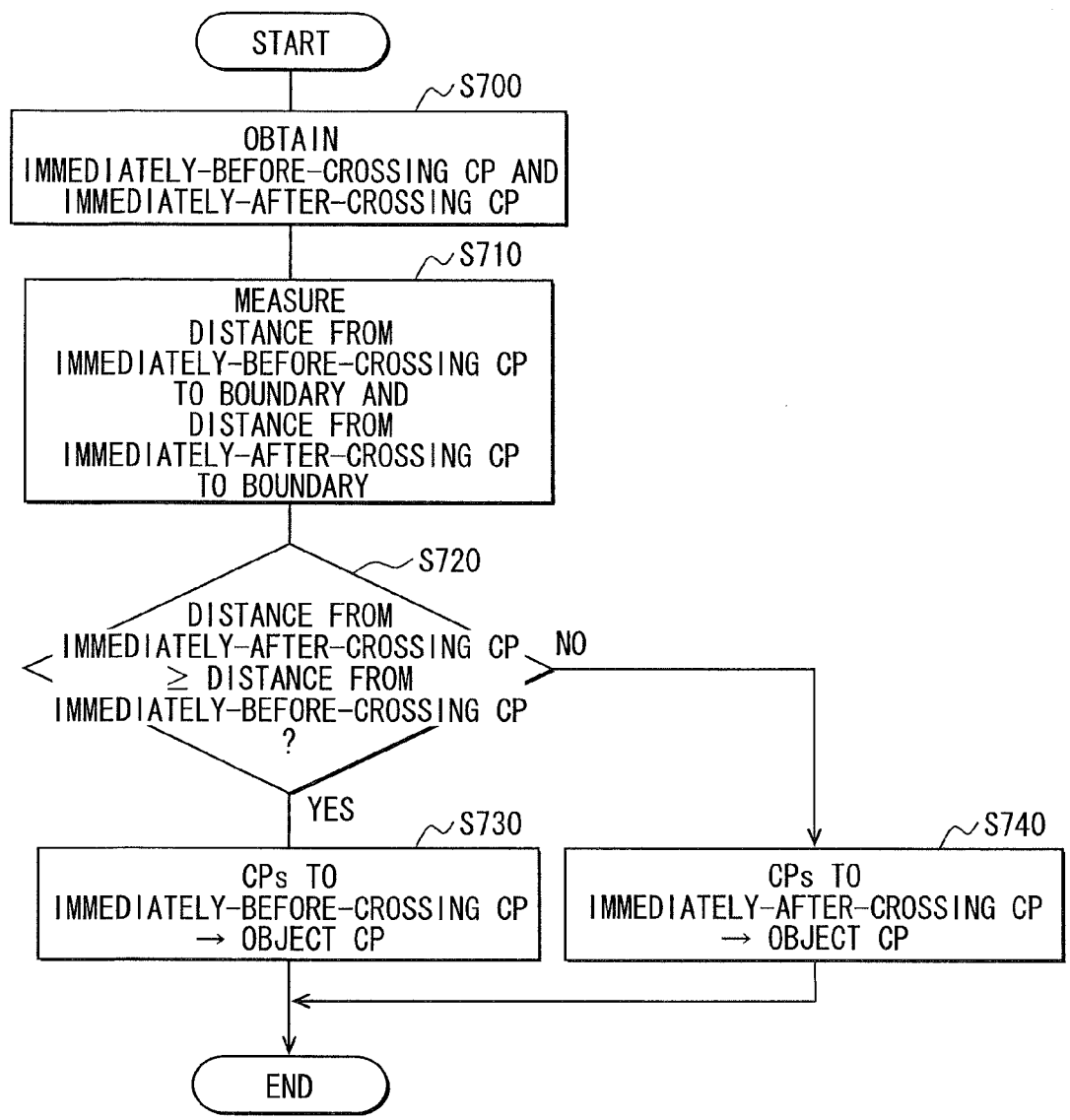
FIG. 35 is a flow chart showing a conversion processing according to other embodiment.

FIG. 35 shows a conversion processing according to other embodiment (3).

In the beginning, at S700, the immediately-before-crossing-boundary CP and the immediately-after-crossing-boundary CP relative to the boundary of the object parcel are retrieved. At subsequent S710, the distance from each CP retrieved at S700 to the boundary of the object parcel is measured. As one example, as shown in FIG. 10B, it is conceived to calculate an intersection K between a straight line, which connects the CPa with the CPb, and the boundary of the object parcel and to measure the linear distances A, B to the intersection K.

At subsequent S720, it is determined whether the distance from the CP (immediately-after-crossing-boundary CP), which is outside the boundary, to the boundary is greater than the distance from the CP (immediately-before-crossing-boundary CP), which is inside the boundary, to the boundary. When the distance from the outside CP to the boundary is determined to be greater than the distance from the inside CP to the boundary (S720: YES), at S730, the CP inside the object parcel is set as the processing object CP. Alternatively, when the distance from the outside CP to the boundary is determined not to be greater than (i.e., less than or equal to) the distance from the inside CP to the boundary (S720: NO), the immediately-after-crossing-boundary CP is set as the processing object CP, in addition to the CP inside the object parcel.

In the case of the CP on the end side shown in FIG. 10B, the linear distance A is compared with the linear distance B. In this case, the CPa, which is inside the object parcel, is set as the CP on the end side when the linear distance B is greater than the linear distance A. Otherwise, the CPb, which is outside the object parcel, is set as the CP on the end side when the linear distance B is less than the linear distance A. In this case, the CP on the end side is determined according to the linear distances A, B. When the region defined by the CPb is determined to be the processing object, accuracy of road estimation around the boundary of the object parcel can be enhanced. Thus, traffic information, such as traffic congestion information, can be sufficiently indicated. In this example, when the region defined by the CPa is otherwise determined to be the processing object, the processing time can be reduced as much as possible.

In both cases, it is advantageous that the processing time for assigning (S110 in FIG. 8) the virtual CP is reduced, and the processing time for recalculation (S120) of the attribute caused by the assignation of the virtual CP can be also reduced, compared with the configuration where the virtual CP is assigned.

<4.2.5 Inheritance of Attributes>

At S130 in FIG. 8, accompanied with the determination of the CPs to be the processing object, inheritance of the attributes is also implemented.

Among the CPs as the DLR data, only the CP, which represents an intersection and having the IP flag being set at 1, includes various kinds of attributes. Therefore, the non-shape-relevant attributes of such a CP is inherited to a CP, which exists between intersections. In this way, acquisition of the non-shape-relevant attributes at each time in processings described later can be omitted. Specifically, the attributes to be inherited are the attribute FC, the attribute FW, the attribute RD, the attribute DD, and the attribute AFR.

In the conversion processing described above, the array of CPs converted into intermediate data is generated. That is, at this time, the CPs have the various kinds of attributes shown in FIG. 4. At least one of the node and the link of the map data also has the attributes corresponding to the attributes of the CPs. Therefore, a road represented by the CPs is finally estimated by comparing the various attributes.

<5. Detail of Matching Processing (Second Half)>

Referring to FIG. 3, at S200 of the matching processing, a candidate link search processing is implemented. In the candidate link search processing, a candidate link array is searched, and thereafter narrowing down processing is implemented for each link. At subsequent S300, a candidate selection processing is implemented. The candidate selection processing is implemented further to narrow down the link, which has been narrowed down at S200. At subsequent S400, a road matching processing is implemented. The road matching processing is implemented to estimate a link, which connects CPs therebetween. The processing of S200 to S400 is repeatedly implemented by the number of the object CPs each being narrowed down at S130 in FIG. 8.

As follows, the processing will be described in detail. FIG. 12 shows an example of the candidate link search processing at S200. At S210, information on the object CP is first obtained. The processing is implemented to obtain the category of the CP, the latitude of the CP, and the longitude of the CP. The category of the CP represents distinction among the CP, which represents an intersection, the virtual CP, and other CPs.

Figure 13A:
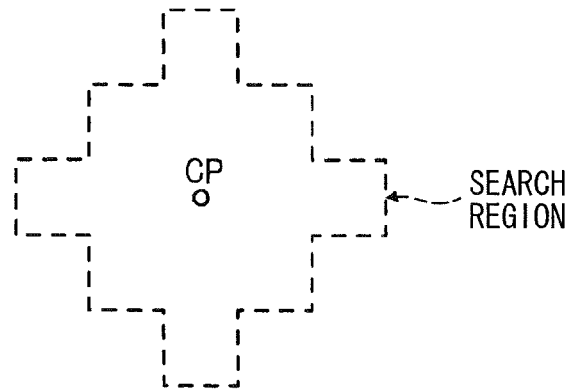
FIGS. 13A, 13B are explanatory views showing a search region for the object CP and retrieval of parcels.

At subsequent S220, a search region is set. The processing is implemented to set the search region of links around the object CP. For example, as shown by the dashed line in FIG. 13A, the search region has the boundary defined by a polygon including a vertical line segment and a horizontal line segment. In the present embodiment, the search region is defined by the region including a square and a cross shape being combined together. The cross shape is longer than one side of the square.

Figure 13B:
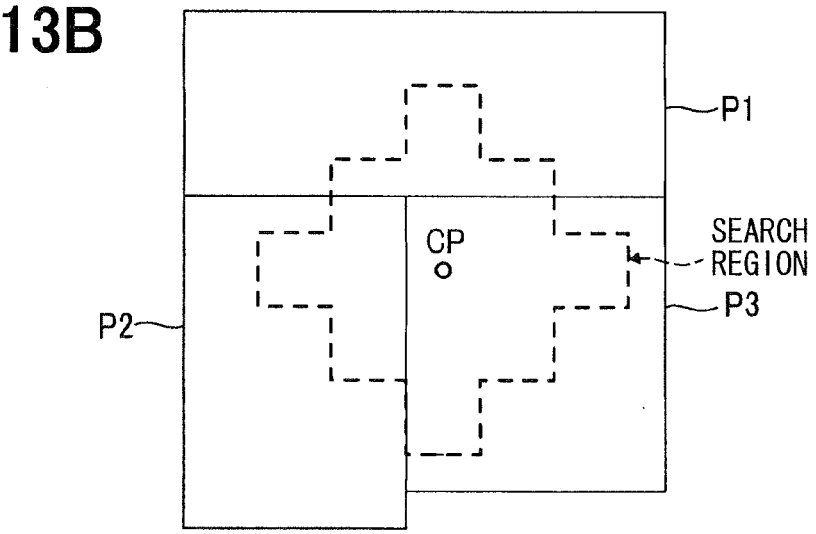

At subsequent S230, a parcel located in the search region is retrieved. This processing is implemented to retrieve all the parcels related to the search region in the selection of the link array, in consideration of that the node and the link are managed by each parcel. For example, as shown in FIG. 13B, the three parcels P1, P2, P3 are retrieved in dependence upon the search region.

At subsequent S240, the link array selection processing is implemented. The link array selection processing is implemented to search links for each link array, according to the non-shape-relevant attributes. The link array is a link group including a series of links having the same road classification, such as a highway or a local road. In this processing, a link array partially included in the parcel retrieved at S230 is a search object. In short, at the present stage, a link array is first narrowed down according to the attributes without determination whether the link array is in the search region.

<5.1 Link-Array Selection Processing>

Figure 14:
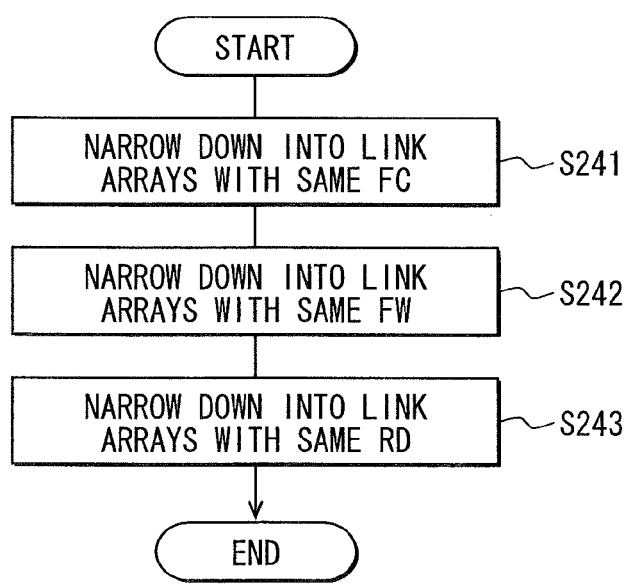
FIG. 14 is a flow chart showing a link array selection processing in the candidate link search processing.

Hereafter, the link-array selection processing will be described in detail. FIG. 14 shows one example of the link-array selection processing. In the link array selection processing, extraction is implemented for each link array according to the attribute FC, the attribute FW, and the attribute RD each being the non-shape-relevant attribute.

At S241, link arrays are narrowed down into link arrays having the same attribute FC. Referring to FIG. 5, the attribute FC represents the road classification, as described above. In this processing, the road classifications assigned to links of a link array are compared with the attribute FC of the object CP to narrow down the link arrays. It is noted that the road classification may change in the course of a link array. In consideration of this, when the road classifications of all the links of a link array coincide with the attribute FC, the link array is determined to be a candidate link array.

At S242, link arrays are narrowed down into link arrays having the same attribute FW. Referring to FIG. 6, the attribute FW represents the physical road type, as described above. In this processing, the physical road types assigned to links of a link array are compared with the attribute FW of the object CP to extract a link array. It is noted that the physical road type may change in the course of a link array. In consideration of this, when the physical road types of all the links of a link array coincide with the attribute FW, the link array is determined to be a candidate link array.

At S243, link arrays are narrowed down into link arrays having the same attribute RD. Referring to FIG. 4, the attribute RD represents the route number or the road name, as described above. In this processing, only when the attribute RD represents the route number, determination of coincidence of the route numbers is implemented. In this case, the route numbers assigned to links of a link array are compared with the attribute RD of the object CP to narrow down link arrays. It is noted that the route number may change in the course of a link array. In consideration of this, when the route numbers of all the links of a link array coincide with the attribute RD, the link array is determined to be a candidate link array.

By implementing the link array selection processing in this way, a link array narrowed down, i.e., extracted according to the non-shape-relevant attribute remains as a candidate link array.

<5.2 Extraction of Link>

At S250 in FIG. 12, a link partially included in the search region centering on, i.e., around the object CP is extracted. The link array is selected in the link array selection processing at S240. Therefore, in this processing, a link partially included in the search region is extracted from the links of the selected link array.

The link partially included in the search region will be described here. The following description is made on the premise that a node is assigned normally to an intersection, a node is assigned to the boundary of a parcel, and a shape-interpolation point is set between nodes as needed.

<5.2.1 Case: Object CP is Intersection>

When the object CP represents an intersection, a node-conscious processing is implemented. The node-conscious processing is implemented, since the object CP is matched with a node when the object CP represents an intersection. Therefore, in this case, when one of two nodes of a link is included in the search region, the link is determined to be a link partially included in the search region.

Figure 15A:
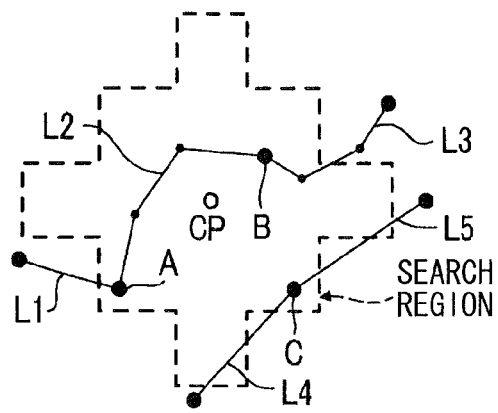
FIGS. 15A, 15B, 15C, 15D are explanatory views showing extraction of a link array in the search region.

For example, it is assumed that the object CP shown in FIG. 15A represents an intersection. In this case, the nodes A, B, C included in the search region are matched with the object CP. Therefore, each of the links L1, L2, L3, L4, L5 having one termination point being one of the nodes A, B, C is the link partially included in the search region.

It is noted that the map data has a level (parcel level) corresponding to its scale size. The parcel level is changed as a user switches the scale size. Therefore, extraction of a link is implemented for all the parcel levels. The parcel level is set sequentially from the lower level in a manner of, for example, LV0 to LV2 to LV4 to LV6 to LV8 to LV10, etc. As the parcel level goes up to the higher level, intersections and roads are reduced.

The CPs are data corresponding to LV0 being the lowest parcel level. Therefore, on the parcel levels higher than LV2, a node corresponding to an intersection does not necessarily exist. In consideration of this, in the extraction processing on the parcel level higher than LV2, even when nodes of a link do not exist in the search region, the link is extracted in a case where the link satisfies a predetermined condition. The case where the link satisfies the predetermined condition will be described later.

<5.2.2 Case: Object CP is Virtual CP>

When the object CP represents a virtual CP, a node-conscious processing is also implemented. The specification of the map data regulates to define a node in a parcel boundary. Therefore, when the object CP is a virtual CP, the virtual CP is assigned in the parcel boundary. In consideration of this, when a node exists in the same parcel boundary, the node is matched with the virtual CP.

Thus, when one of nodes of a link exists in a parcel boundary and when the one node existing in the parcel boundary is included in the search region, the link is determined to be the link partially included in the search region.

Figure 15B:
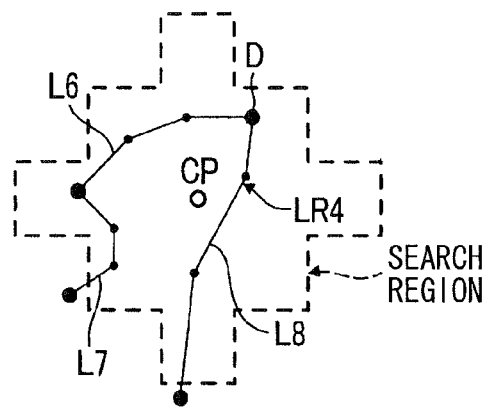

For example, as shown in FIG. 15B, it is supposed that the object CP represents the virtual CP, and the node D exists in the parcel boundary. In this case, the links L6, L8 having the node D as one termination point are the links partially included in the search region.

<5.2.3 Case: Object CP is Neither Intersection Nor Virtual CP>

In this case, it is unknown whether the object CP can be matched with a node. Therefore, a link is extracted without being conscious of a node. In short, in the case where the object CP is neither an intersection nor a virtual CP, a link, in which at least one of nodes is included in the search region, and a link, in which none of nodes is included in the search region, are extracted in a case where the link satisfies a predetermined condition. In this case, the extraction of a link is implemented in a similar manner on all the parcel levels.

<5.2.4 Case where Link Satisfies Predetermined Condition>

Figure 15C:
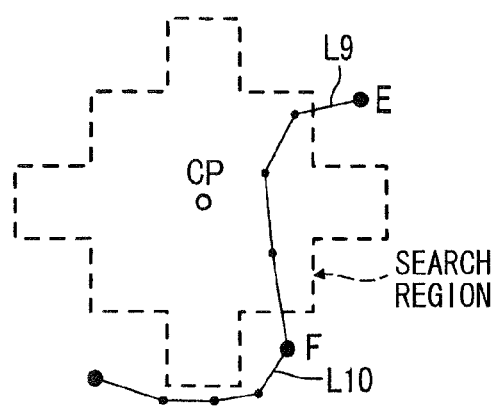
Figure 15D:
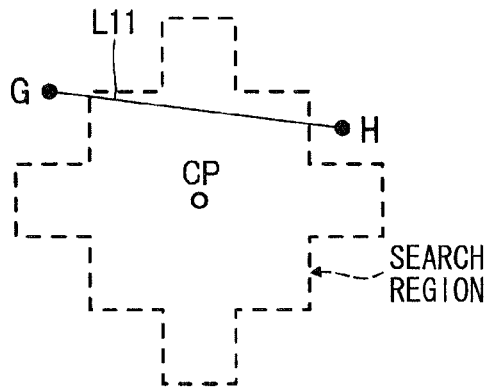

In the following two cases, the link satisfies the predetermined condition. In one of the two cases, shape-interpolation points are set between the two nodes, and a line segment connecting the shape-interpolation points is partially included in the search region. For example, as shown in FIG. 15C, a link L9 includes a line segment, which connects the shape-interpolation points (small black dots), and the line segment of the link L9 is partially included in the search region. Therefore, although the nodes E, F are not included in the search region, the link L9 is the link partially included in the search region. On the other hand, the link L10 includes a line segment, which connects the shape-interpolation points, and the line segment of the link L10 is not partially included in the search region. Therefore, the link L10 is not the link partially included in the search region. In the other of the two cases, a shape-interpolation point is not set between the two nodes, and a line segment connecting the two nodes is partially included in the search region. For example, as shown in FIG. 15D, a link L11 includes two nodes G, H connected by a line segment, and the line segment is partially included in the search region. Therefore, the link L11 is the link partially included in the search region.

<5.2.5 Others>

Referring to FIG. 12, at subsequent S260, links partially included in the search region are narrowed down into a link having the attribute RD being coincident. When the attribute RD represents a route number, the determination is made at S243 in FIG. 14. Therefore, in this processing, coincidence is determined according to a road name when the attribute RD represents the road name. It is regulated that the road name includes five characters at maximum. Therefore, it is determined whether the character string being the value of the attribute RD is included in the road name assigned to the link.

At S270, ten links at maximum are extracted. Specifically, when the number of links is more than ten after the narrowing down at S260, ten links are selected sequentially from one link near the object CP. Specifically, for example, a perpendicular line may be drawn from the object CP to each link to measure the distance between the object CP and each link, and thereby it is determined whether the link is near the object CP.

<5.3 Candidate Selection Processing>

Figure 16:
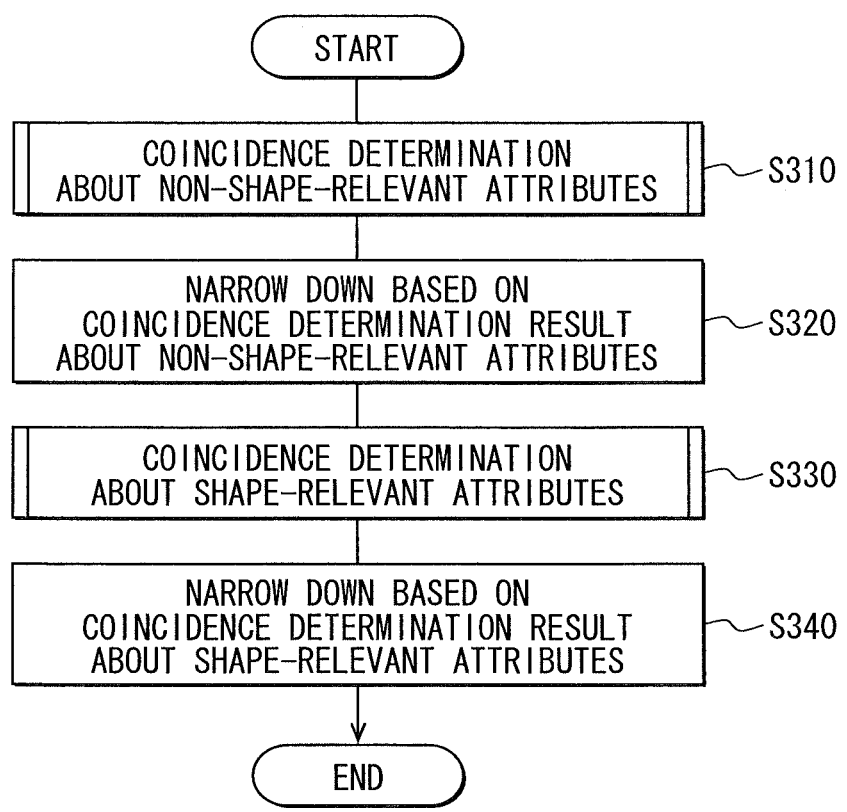
FIG. 16 is a flow chart showing a candidate selection processing in the matching processing.

Subsequently, the candidate selection processing at S300 in FIG. 3 will be described. The candidate selection processing is implemented to select a candidate for each of links and nodes. FIG. 16 shows one example of the candidate selection processing.

At S310, coincidence determination is implemented according to non-shape-relevant attributes. In this processing, the coincidence determination is implemented for the link extracted at S200 and/or the nodes of the extracted link according to the attribute FC, the attribute FW, the attribute IT, the attribute RDI, the attribute DD, and the attribute AFR. Details of the coincidence determination processing will be described later in detail. The attribute FC and the attribute FW are already used in the narrowing down processing of the link array at S241, S242 in FIG. 14. Therefore, this processing may include a redundant processing. Nevertheless, the narrowing down processing is again implemented in order to make sure the narrowing down processing. This coincidence determination is implemented further by using the attribute IT, the attribute RDI, the attribute DD, the attribute AFR, and the like in order to implement a finer coincidence determination processing to surely retrieve a correct result.

At subsequent S320, a candidate link is narrowed down, i.e., extracted based on the determination result according to the non-shape-relevant attributes. Specifically, as a result of the coincidence determination according to the non-shape-relevant attributes at S310, a link having many coincident attributes is determined to be a candidate link.

At subsequent S310, coincidence determination is implemented according to shape-relevant attributes. In this processing, the coincidence determination is implemented for the candidate link determined at S320 and/or the nodes of the determined link according to the attribute BR, the attribute PCI, the attribute CA, and the attribute DCA. Details of the coincidence determination processing will be described later in detail.

At subsequent S340, a candidate link is further narrowed down, i.e., extracted based on the determination result according to the shape-relevant attributes. Specifically, as a result of the coincidence determination according to the shape-relevant attributes at S330, a link having many coincident attributes is determined to be a candidate link.

<5.3.1 Coincidence Determination According to Non-Shape-Relevant Attribute>

Figure 17:
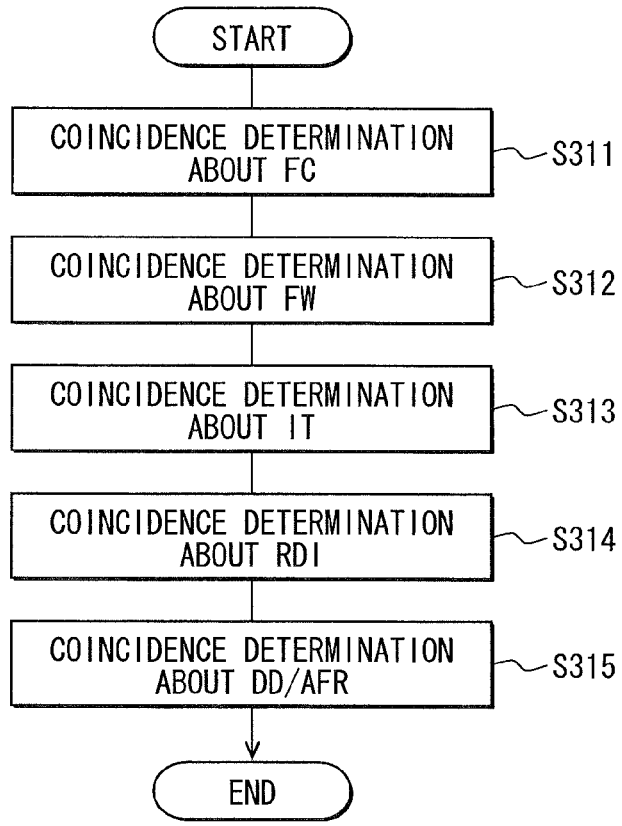
FIG. 17 is a flow chart showing a coincidence determination processing according to non-shape-relevant attributes in the candidate selection processing.

As follows, the coincidence determination according to non-shape-relevant attributes at S310 will be described in detail. FIG. 17 shows one example of the coincidence determination according to the non-shape-relevant attributes.

At S311, coincidence determination is implemented according to the attribute FC. Referring to FIG. 5, the attribute FC represents the road classification, as described above. In this processing, coincidence is determined between the road classification assigned to a link being a determination object and the attribute FC of the object CP.

At subsequent S312, coincidence determination is implemented according to the attribute FW. Referring to FIG. 6, the attribute FW represents the physical road type, as described above. In this processing, coincidence is determined between the physical road type assigned to a link being a determination object and the attribute FW of the object CP.

At subsequent S313, coincidence determination is implemented according to the attribute IT. Referring to FIG. 7, the attribute IT represents the classification of an intersection, as described above. Therefore, only when the object CP represents an intersection, the coincidence determination is implemented.

At least one of the nodes and the links has an attribute equivalent to the attribute IT. In consideration of this, when a node has intersection classification information, which represents the classification of an intersection, coincidence is determined between the intersection classification information on the node corresponding to the object CP and the attribute IT of the object CP. Further, when a link has intersection classification information, which represents the classification of an intersection, coincidence is determined between the intersection classification information on the link connecting to a node, which corresponds to the object CP, and the attribute IT of the object CP. In the latter case, the link may have the intersection classification information on two nodes. Therefore, in this case, coincidence is determined between the intersection classification information on one of the nodes and the attribute IT.

At subsequent S314, coincidence determination is implemented according to the attribute RDI. In FIG. 4, the attribute RDI represents the name of an intersection, as described above. Therefore, only when the object CP represents an intersection, the coincidence determination is implemented. In this processing, coincidence is determined, between the intersection name of a node corresponding to the object CP and the attribute RDI of the object CP. This processing is implemented by determining whether the character string, which is the value of the attribute RDI, is included in the intersection name.

At subsequent S315, coincidence determination is implemented according to the attribute DD and the attribute AFR. Referring to FIG. 4, the attribute DD represents a legally-permitted driving direction, and the attribute AFR is a flag, which represents whether the attribute DD is referable. In this processing, the determination is made by comparing the attribute DD of the object CP with an attribute (one-way traffic code) of the link being the determination object. The determination is implemented when the attribute AFR is set at 1 to represent that the attribute DD is valid, excluding a case where the attribute DD is 0 (undefined). It is noted that the attribute DD represents the drivable direction of the road with respect to certain traffic information. Therefore, based on the comparison between the attribute DD and the one-way traffic code of the link, determination of the forward/backward direction of both the items cannot be made. Therefore, in this processing, only the determination whether the road is a one-way traffic road or a two-way traffic road is implemented, and determination of coincidence of the passing direction (drivable direction) is not implemented.

<5.3.2 Coincidence Determination According to Shape-Relevant Attribute>

Figure 18:
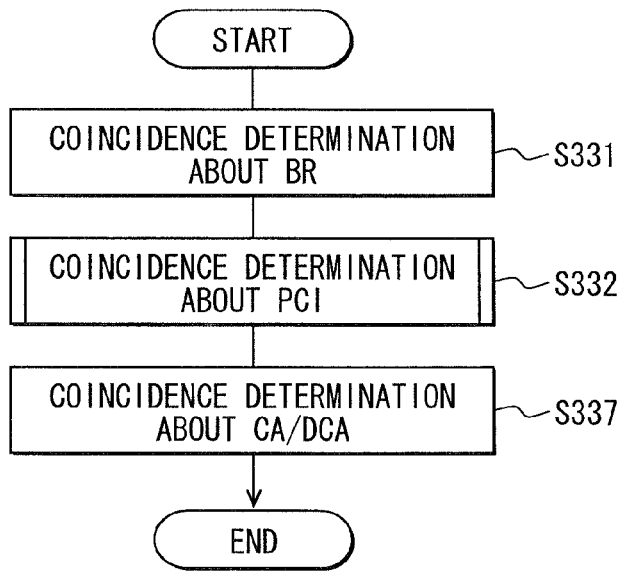
FIG. 18 is a flow chart showing a coincidence determination processing according to shape-relevant attributes in the candidate selection processing.

As follows, the coincidence determination according to the shape-relevant attributes at S330 will be described in detail. FIG. 18 shows one example of the coincidence determination processing according to the shape-relevant attributes.

At S331, coincidence determination is implemented according to the attribute BR. In FIG. 4, the attribute BR represents the geographical angle to the subsequent CP, as described above. A link has an attribute representing the traveling direction legally regulated by law. In consideration of this, non-coincidence determination is implemented in this processing when the traveling direction of the link largely differs from the direction represented by the attribute BR of the object CP. For example, it is conceived to make non-coincidence determination when the angle between the vector, which represents the traveling direction of the link, and the vector, which is directed to the subsequent CP and represented by the attribute BR, is greater than or equal to a predetermined angle, such as 90 degrees. When the link is a two-way traffic road to allow two-way traveling in both traveling directions, the determination is made based on two vectors each representing the traveling direction.

Figure 19A:
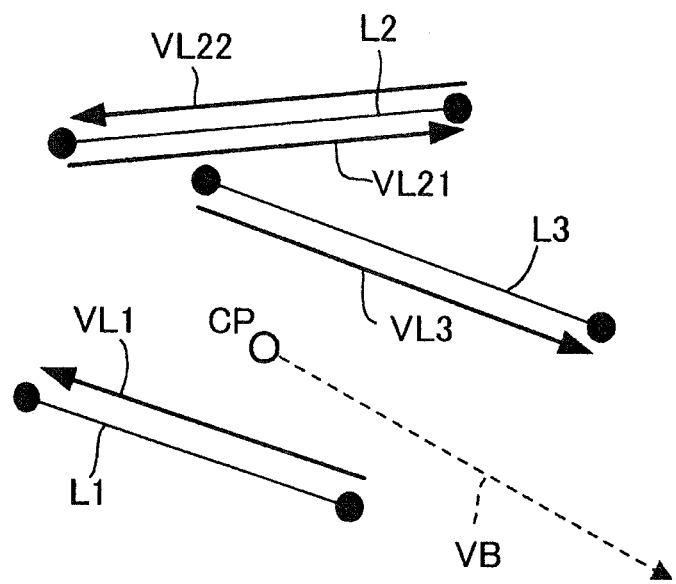
FIGS. 19A, 19B are explanatory views showing a coincidence determination processing according to an attribute BR.

For example, in the example of FIG. 19A, the determination is made based on the angle between the vectors VL1, VL21, VL22, VL3, which respectively represent the traveling directions of the links L1, L2, L3, and the vector VB represented by the attribute BR. In this case, when the angle between both the vectors is greater than or equal to 90 degrees, the non-coincidence determination is made. Specifically, when the angle between the vector VL1 and the vector VB is greater than or equal to 90 degrees, the non-coincidence determination is made. Determinations for the vectors VL21, VL22, VL3 are made, similarly to the determination for the vector VL1. The link L2 is a two-way traffic road to allow two-way traveling in both traveling directions. Therefore, the determination for the link L2 is made based on the two vectors VL21, VL22 representing the traveling directions.

In this example of FIG. 19, the angle between the vector VB and the vector VL1 is approximately 180 degrees and is greater than or equal to 90 degrees. Therefore, non-coincidence determination is made for the link L1. The angle between the vector VL22 of the link L2 and the vector VB is greater than or equal to 90 degrees. Nevertheless, the angle between the vector VL21 of the link L2 and the vector VB is less than 90 degrees. Therefore, coincidence determination is made for the link L2. The angle between the vector VL3 of the link L3 and the vector VB is less than 90 degrees. Therefore, coincidence determination is made for the link L3.

Figure 19B:
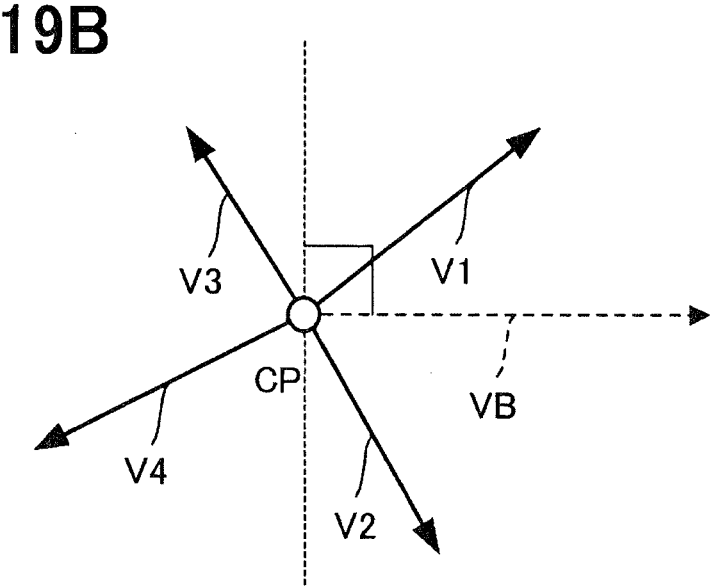

In this example, the non-coincidence determination is made when the angle is greater than or equal to 90 degrees. Therefore, as shown in FIG. 19B, with respect to the vector VB represented by the attribute BR, the coincidence determination is made for the traveling directions of the links represented by the vectors V1, V2, and the non-coincidence determination is made for the traveling directions of the links represented by the vectors V3, V4.

At S332 in FIG. 18, coincidence determination is implemented according to the attribute PCI. In FIG. 4, the attribute PCI represents one of driveways being selected when multiple driveways exist in the same direction, as described above.

The attribute PCI includes the number of driveways and the sequence number representing the road in the driveways. It is noted that when coincidence determination processing is implemented based on the attribute PCI, all links directed in parallel need to be identified.

Figure 20:
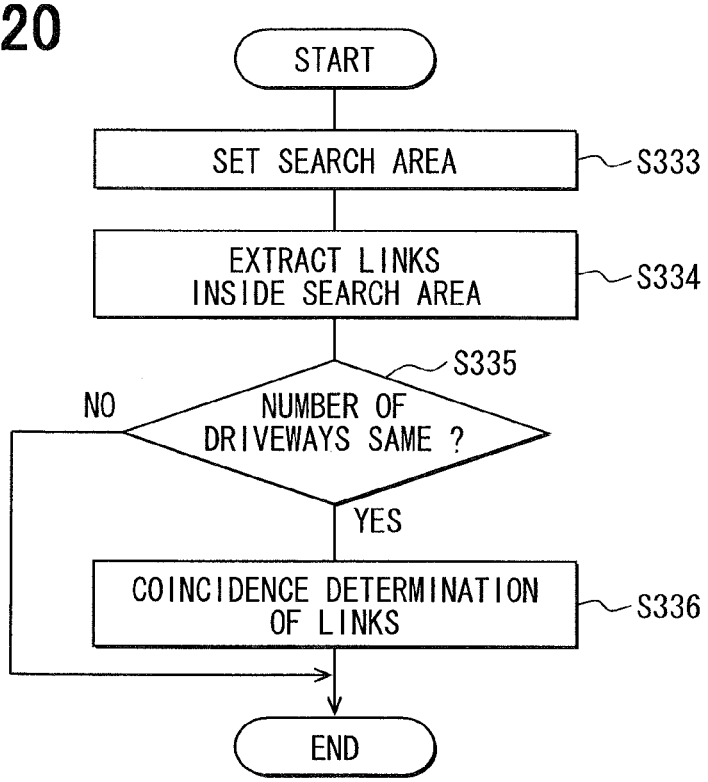
FIG. 20 is a flow chart showing a coincidence determination processing according to the attribute PCI in the coincidence determination processing according to the shape-relevant attributes.

In consideration of this, at S333 in FIG. 20, a search area around the object CP is set. It is conceivable to set the search area to be the inside of the circle centering on the object CP. More specifically, for example, the search area may be set within a circle centering on the object CP and having a predetermined radius such as 150 meters. It is noted that a default value of the search area may be assigned as one value of the PCI attribute. In this case, it is conceivable to set the search area within a circle centering on the object CP and having a radius being a summation of a predetermined distance such as 150 meters and the default value.

At subsequent S334, links in the search area are extracted. The attribute PCI includes an indicator type as one attribute. Therefore, in this processing, a virtual straight line is drawn in the direction along the latitude or in the direction along the longitude according to the indicator type, thereby to extract links intersecting to the virtual straight line.

At subsequent S335, it is determined whether the number of the extracted links coincides with the number of the driveways. When it is determined that the number of the extracted links coincides with the number of the driveways (S335: YES), at S336, the links are identified based on the sequence number. Further, it is determined whether the identified links coincide with links of the determination object. Thus, the coincidence determination according to the attribute PCI is terminated. Otherwise, when the number of the extracted links does not coincide with the number of the driveways (S335: NO), the processing at S336 is not implemented, and the coincidence determination according to the attribute PCI is terminated. In this case, the processing at S336 is omitted, since wrong determination may be made when the number of the extracted links does not coincide with the number of the driveways.

Figure 21A:
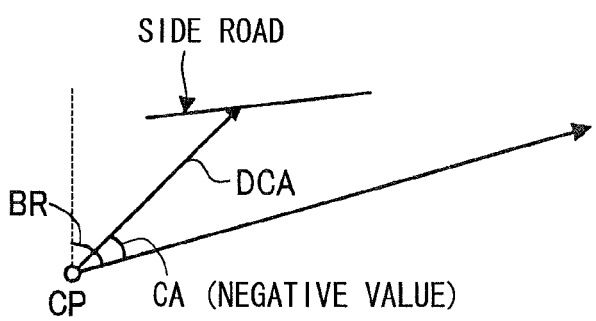
FIGS. 21A, 21B are explanatory views showing a coincidence determination processing according to an attribute CA and an attribute DCA.
Figure 21B:
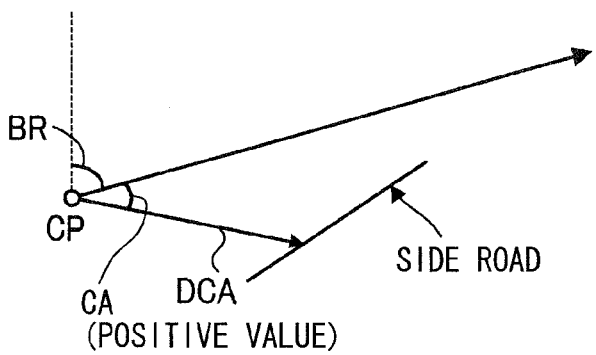

Referring to FIG. 18, at S337, coincidence determination is made according to the attribute CA and the attribute DCA. Referring to FIG. 4, the attribute CA represents the angle relative to a side road, and the attribute DCA represents the connection distance to the side road. In this processing, the direction to the side road is first detected. Specifically, as shown in FIG. 21A, when the attribute CA is a negative value, it is determined that the side road is located on the left side relative to the direction, which is represented by the attribute BR and directed to the subsequent CP. Otherwise, as shown in FIG. 21B, when the attribute CA is a positive value, it is determined that the side road is located on the right side relative to the direction, which is represented by the attribute BR and directed to the subsequent CP. When the attribute CA is 0, the direction of the side road cannot be identified. Therefore, in this case, the coincidence determination processing is not implemented. Subsequently, coincidence determination about the attribute CA and the attribute DCA is implemented based on the physical relationship between the link of the determination object and the side road of the link.

In the candidate selection processing of S300 as described above, the links being the candidates are selected around each CP. The road matching processing (S400) in FIG. 3 is implemented in order to estimate a link, which connects these links, i.e., to implement a link, which connects CPs therebetween.

<5.4 Road Matching Processing>

Figure 22:
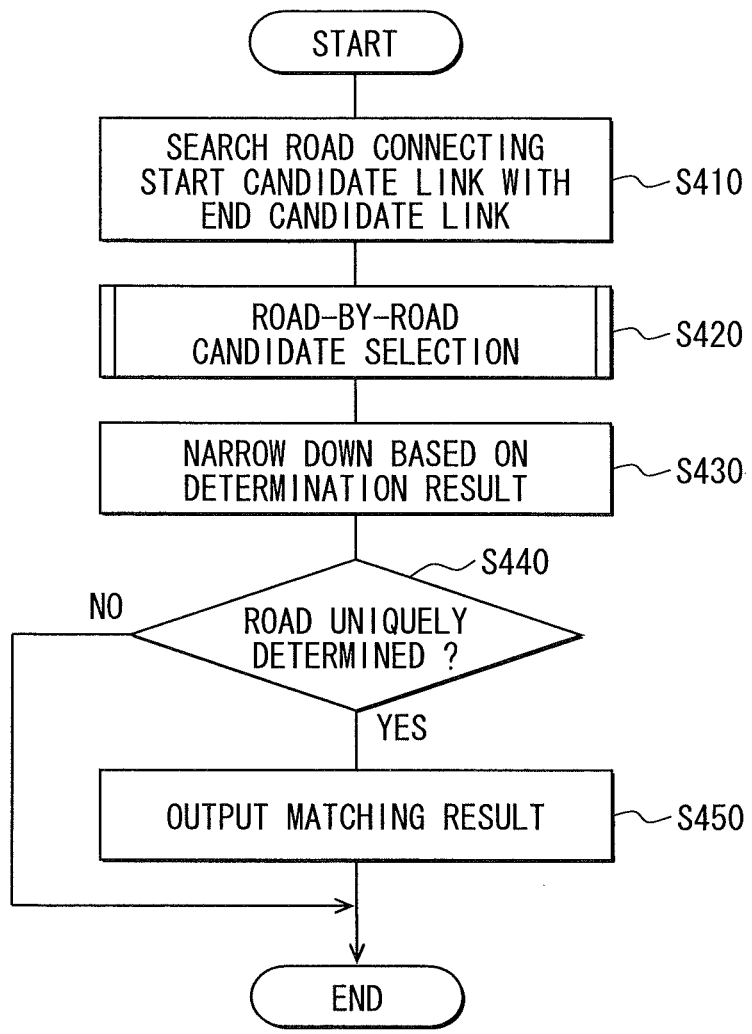
FIG. 22 is a flow chart showing a road matching processing in the matching processing.

Next, the road matching processing at S400 will be described. FIG. 22 shows one example of the road matching processing. In the road matching processing, two CPs are defined as object CPs. Further, the CP on the start side of the two CPs is a start-side CP, and the CP on the end side of the two CPs is an end-side CP.

<5.4.1 Road Search>

Figure 23A:
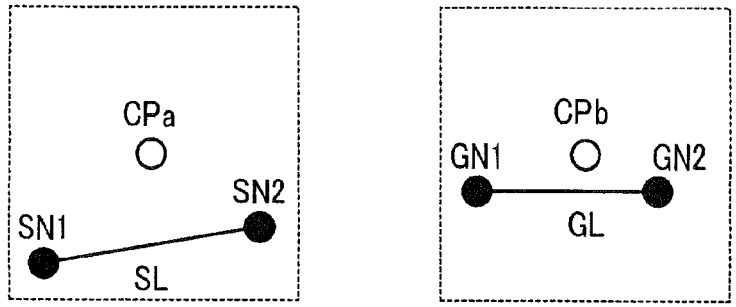
FIGS. 23A, 23B, 23C, 23D are explanatory views showing omission methods for the road search processing.

At S410, a search processing is implemented to search a road, which connects a start-side candidate link with an end-side candidate link. The start-side candidate link is a link extracted for the start-side CP. The end-side candidate link is a link extracted for the end-side CP. In this processing, all the roads, each of which connects the start-side candidate link with the end-side candidate link, are searched. In one example shown in FIG. 23A, the start-side CP is a CPa, the end-side CP is a CPb, the extracted link for the CPa is SL, and the extracted link for the CPb is GL. In this case, the search processing is implemented to search a road connecting the start-side candidate link SL with the end-side candidate link GL. It is noted that the search processing searches the road for all the combinations between any one of the two nodes SN1, SN2 of the link SL and any one of the two nodes GN1, GN2 of the link GL. More specifically, the processing searches the road connecting the SN1 with the GN1 in this order, the road connecting the SN1 with the GN2 in this order, the road connecting the SN2 with the GN1 in this order, and the road connecting the SN2 with the GN2 in this order.

At subsequent S420, a road-by-road candidate selection is implemented. This processing is implemented to determine a candidate road among the roads searched at S410 based on various kinds of shape-relevant attributes. At subsequent S430, a candidate road is narrowed down based on the determination result at S420.

At the subsequent S440, it is determined whether a road is uniquely determined. When a road is uniquely determined (S440: YES), a matching result is outputted at S450, and thereafter, the road matching processing is terminated. Otherwise, when a road is not uniquely determined (S440: NO), the processing at S450 is not implemented, and the road matching processing is terminated.

<5.4.2 Omission of Road Search>

In this way, the road matching processing (S410 to S440) is repeated for the two object CPs being paired. It is noted that at S410, a road to be searched using the result of the road matching processing may be omitted.

Figure 23B:
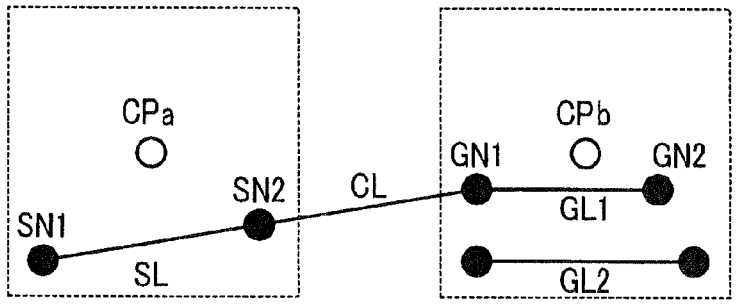

For example, as shown in FIG. 23B, it is supposed that a road from the link SL through the link CL to the link GL1 is uniquely determined, as a result of the road matching processing between the CPa and the CPb. In this case, when the road matching processing is implemented to search a road from the CPb to the subsequent CP, a road connected from the link GL1 is searched. That is, even when the link GL2 exists in the candidate links, the road search processing starting from the link GL2 is omitted.

Figure 23C:
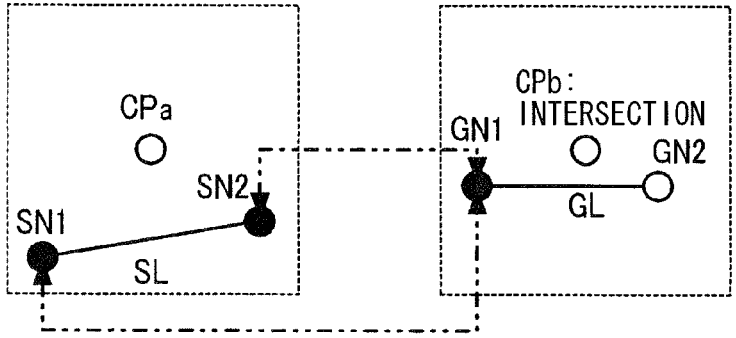

In addition, the road search processing is omitted according to the category of the CP. Specifically, for example, as shown in FIG. 23C, when the CPb is an intersection, the CPb coincides with the node GN2, which represents an intersection. Therefore, in this case, the road search processing is implemented for the link GL to search a road connected to the one node GN1 of the link GL. That is, the processing searches a road connecting the node SN1 with the node GN1 and a road connecting the node SN2 with the node GN1.

Figure 23D:
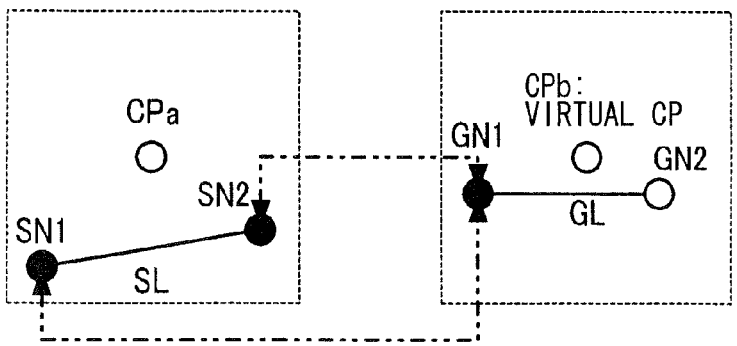

As shown in FIG. 23D, when the CPb is a virtual CP and when the node GN2 is located in the boundary of the object parcel, the node is the start-side node or the end-side node. In consideration of this, a road connected to one node GN1 is searched for the link GL, similarly to the previous case. That is, the processing searches a road connecting the node SN1 with the node GN1 and a road connecting the node SN2 with the node GN1.

Figure 24A:
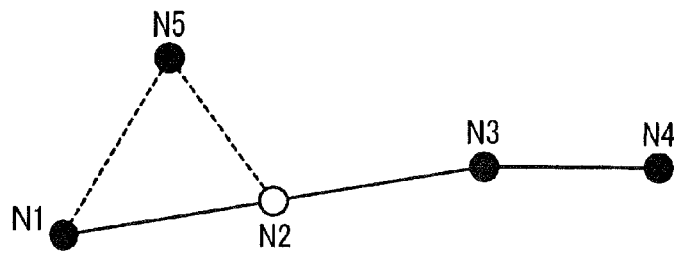
FIGS. 24A, 24B, 24C are explanatory views showing omission methods for the road search processing.

It is further conceived not to again search a road, which is once searched, thereby to reduce a required time for the road search processing. For example, as shown by the solid line in FIG. 24A, it is supposed that the search processing is first implemented and has searched a road starting from the node N1 through the nodes N2 and N3 to the node N4 in this order. In this case, when the road search processing is second implemented from the node N1, the road search processing is implemented to search a road starting from the node N1 through the node N5 to the N2. It is noted that, the road search processing for searching a road from the node N2 has been already implemented. Therefore, the road search processing for searching a road starting from the node N2 is not implemented at this time.

Figure 24B:
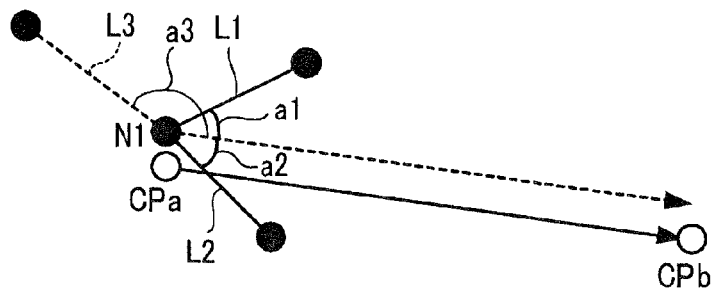

In addition, when a link branches from a node, a priority is assigned to the link, and the road search processing is implemented. For example, when the road search processing is implemented from a certain node, a reference direction in which the certain node is connected with the object CP is calculated. Subsequently, an angle between each of links, which is connected with the certain node, and the reference direction is calculated. Thus, only links within a predetermined angle are set as objects in the road search processing. In the example shown in FIG. 24B, the road search processing is implemented to search a road starting from the node N1. In his case, the reference direction is set at the direction from the CPa to the CPb. Further, the angles a1, a2, a3 of the links N1, L2, L3 each connected with the node N1 are calculated relative to the reference direction. In the present example, the angles a1, a2 are within the predetermined angle, and therefore, the links L1, L2 are set as the objects of the road search processing. In addition, the angle a3 is out of the predetermined angle, and therefore, the link L3 is excluded from the object of the road search processing.

Figure 24C:
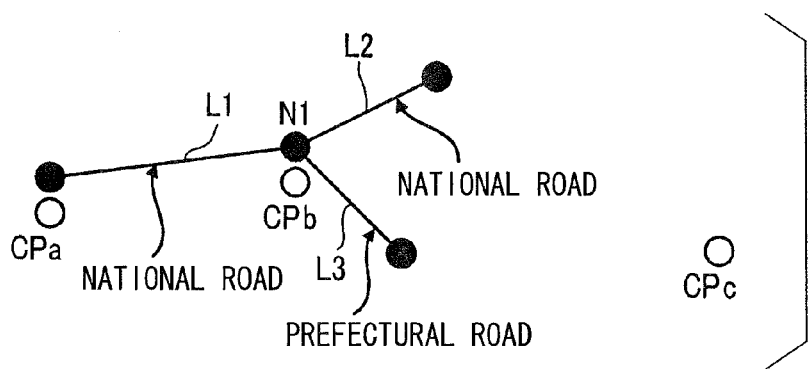

Furthermore, when the search processing is implemented from a certain node, a link, which has the road classification being the same as the road classification of the link to certain the node, is set as the object of the road search processing. In the example shown in FIG. 24C, a road, which starts from the CPb to the CPc, is searched from the node N1. In this case, it is assumed that the road between the CPa to the CPb has been determined as the link L1. At this time, the road classification of the link L1 represents a national road. Therefore, in the road search from the node N1, the link L2, which has the road classification representing a national road, is set as the object of the road search. That is, the link L3, which has the road classification representing a prefectural road, is excluded from the object of the road search.

<5.4.3 Stop of Road Search>

The road search processing at S410 is not necessarily completed within a predetermined time. In consideration of this, the road search processing may be aborted in the course of the processing.

Figure 25A:
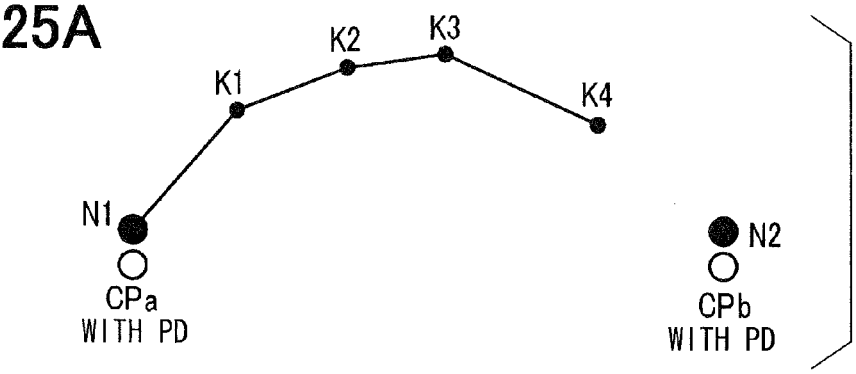
FIGS. 25A, 25B, 25C, 25D are explanatory views showing stop methods for the road search processing.

For example, it is conceivable to use the attribute PD. In the example shown in FIG. 25A, it is supposed that both the CPa and the CPb respectively have the attributes PD. In this case, when a road is searched from the node N1 to the node N2, the accumulation distance is calculated along the shape-interpolation points K1, K2, K3, K4. When the accumulation distance becomes greater than or equal to the value of the attribute PD by the certain value, the road search processing is stopped.

Figure 25B:
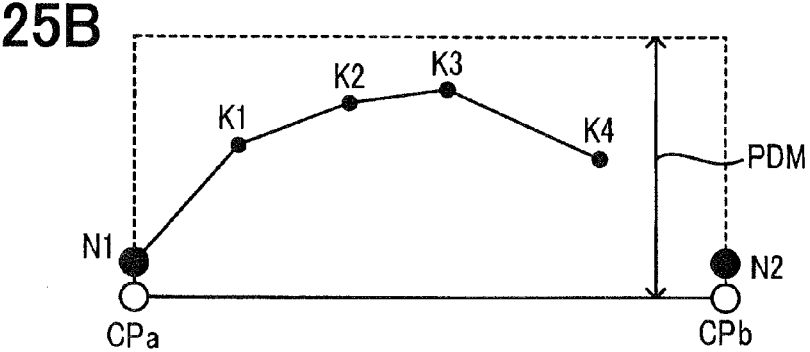

Alternatively, for example, it is conceivable to use the attribute PDM. Specifically, as shown in FIG. 25B, the distance along the U-shaped path shown by the dashed line is calculated by using the linear distance between the CPa and the CPb and the value of the attribute PDM. In this case, when a road is searched from the node N1 to the node N2, the accumulation distance is calculated along the shape-interpolation points K1, K2, K3, K4. When the accumulation distance becomes greater than or equal to the distance along the U-shaped path shown by the dashed line by the certain value, the road search is stopped.

Figure 25C:
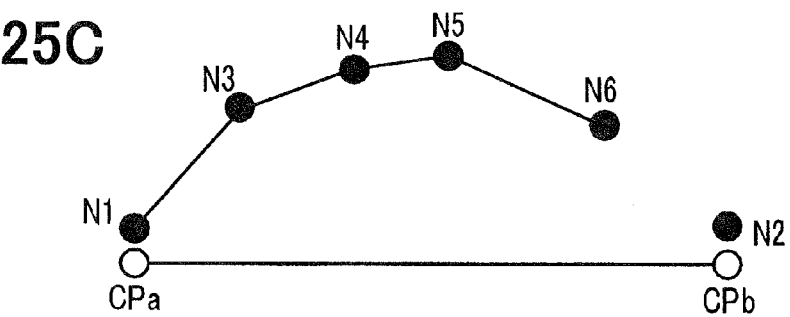

Alternatively, for example, it is conceivable to use the number of the nodes to be passed. Specifically, in the example shown in FIG. 25C, when the road search processing is implemented to search a road starting from the node N1 to the node N2, the number of the nodes N3, N4, N5, N6 being passed therethrough is counted. When the counted number of the nodes becomes greater than the certain value, the road search processing is stopped.

Figure 25D:
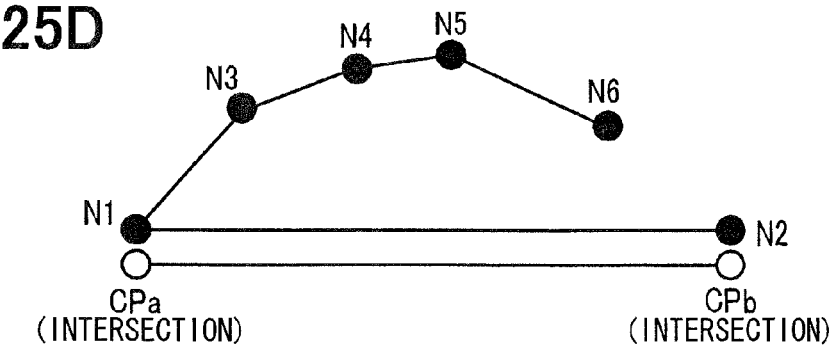

Alternatively, for example, it is conceivable to use that a CP is an intersection. In the example shown in FIG. 25D, it is supposed that both the CPa and the CPb are respectively intersections. In this case, when both the node N1 and the node N2 are respectively intersections, the node N1 and the node N2 respectively coincide with the CPa and the CPb. Therefore, the linear distance between the node N1 and the node N2 is calculated beforehand. When a road starting from the node N1 to the node N2 is searched, the accumulation distance of the path passing through the nodes N3, N4, N5, N6 is calculated. Thus, in this case, when the accumulation distance becomes greater that or equal to the linear distance between the node N1 and the node N2, which is calculated beforehand, by the certain value, the road search processing is stopped.

In any of the four methods as described above, the road search processing is stopped in the course of the processing when determined to be wrong. Therefore, the processing load for the road search processing is reduced.

<5.4.4 Road-by-Road Candidate Selection>

Figure 26:
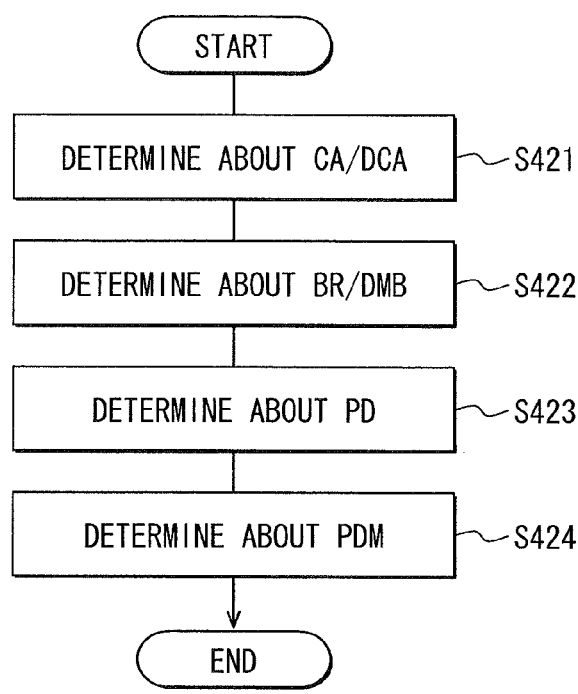
FIG. 26 is a flow chart showing a road-by-road candidate selection processing in the road matching processing.

As follows, the road-by-road candidate selection processing in FIG. 22 will be described. FIG. 26 shows one example of the road-by-road candidate selection processing. The road-by-road candidate selection processing is implemented to make determination of "OK" or "NG" road by road (per road unit) for the roads extracted between the CPs.

Figure 27A:
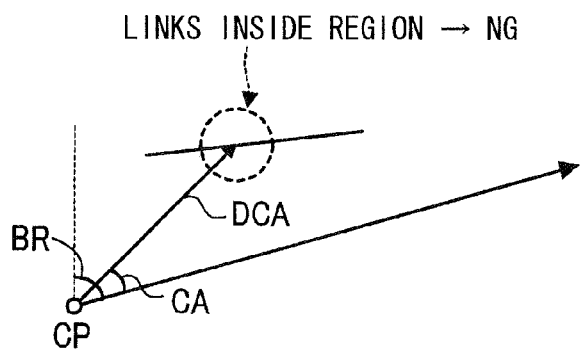
FIGS. 27A, 27B are explanatory views showing a road selection processing according to the attribute CA and the attribute DCA.
Figure 27B:
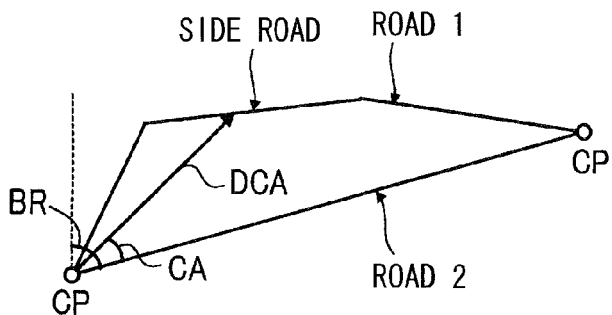

At S421, determination is implemented according to the attributes CA, DCA. Referring to FIG. 4, the attribute CA represents the angle relative to a side road, and the attribute DCA represents the connection distance to the side road, as described above. In this processing, it is determined whether a link of the searched roads is a side road based on the attribute CA and the attribute DCA. On determination of a side road, an NG determination is made to the link. Specifically, as shown by the dashed line in FIG. 27A, when the circumference of coordinates represented by the attribute CA and the attribute DCA includes a link, an NG determination is made to a road including the link. For example, FIG. 27B shows a road 1 and a road 2 connecting the CPs therebetween. In this example, a link is determined to be a side road based on the attribute CA and the attribute DCA. Therefore, an NG determination is made to the road 1 including the link determined to be a side road.

Figure 28:
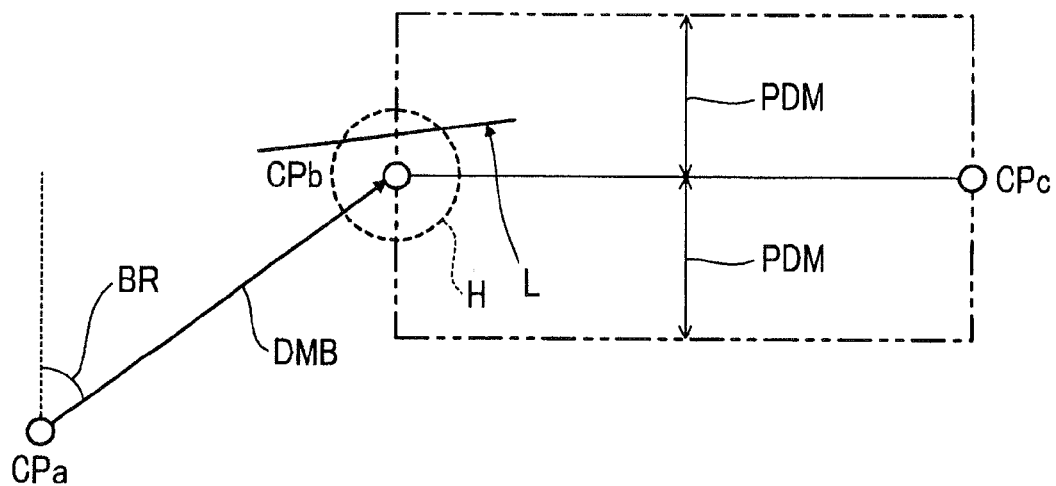
FIG. 28 is an explanatory view showing a road selection processing according to the attribute BR and an attribute DMB.

At S422 in FIG. 26, determination is implemented according to the attributes BR, DMB. In FIG. 4, the attribute BR represents the angle to the subsequent CP, and the attribute DMB represents the linear distance to the subsequent CP, as described above. When deviation exists between data represented by the attribute CP and the map data of the navigation device 10, a road being further possible can be identified by using the attribute BR and the attribute DMB. In consideration of this, as shown in FIG. 28, determination of the road between the CPb and the CPc is implemented by using the attribute BR and the attribute DMB of the CPa in advance of the CPb. Specifically, an OK determination is made to the road including the link L around the coordinates identified by the attribute BR and the attribute DMB. In this case, the link L overlaps the region H shown by the dashed line around the coordinates. The determination is implemented for a road between the CPb and the CPc. Therefore, the determination is made on condition that a node of the link L or a shape-interpolation point of the link L is in the predetermined region. For example, it is conceivable to define the predetermined region in the rectangle area shown by the two-dot chain line in FIG. 28 according to the line segment, which connects the CPb with the CPc, and the attribute PDM. The predetermined region is not limited to the rectangle area and may be defined in an ellipse, which passes the CPb and the CPc.

At subsequent S423, determination is implemented according to the attribute PD. In FIG. 4, the attribute PD is the travel distance to the subsequent CP having the attribute PD, as described above. Therefore, it is determined whether a searched road is a candidate according to the travel distance of the searched road.

Figure 29:
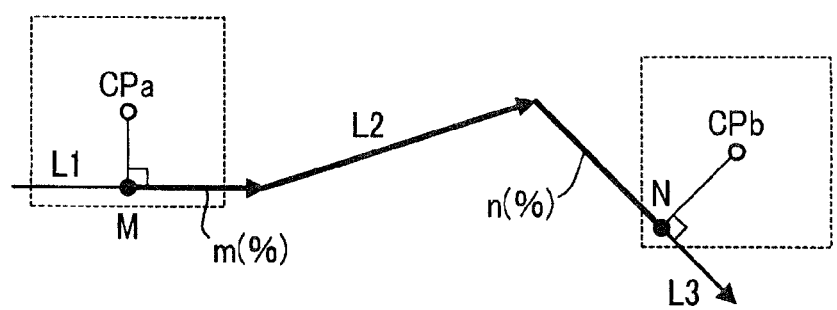
FIG. 29 is an explanatory view showing calculation of a road length according to an attribute PD.

Specifically, in the example shown in FIG. 29, the travel distance between the CPa and the CPb is calculated. In this case, each of the CPs does not necessarily coincide with a node. Therefore, a perpendicular line is drawn from the CPa to the link L1, and the intersection M is set between the perpendicular line and the link L1. In addition, a perpendicular line is further drawn from the CPb to the link L3, and the intersection N is set between the perpendicular line and the link L3. Thus, the travel distance from the intersection M to the intersection N is calculated.

The travel distance from the intersection M to the next node is obtained by calculating a rate (percentage) of the travel distance relative to the link L1. Specifically, in the case where the distance from the intersection M to the next node is m percent (%) of the link L1, the travel distance of the link L1 is multiplied by (m/100) to calculate the travel distance from the intersection M to the next node.

Similarly, the travel distance from the intersection N to the preceding node is obtained by calculating a rate (percentage) of the travel distance relative to the link L3. Specifically, in the case where the distance from the intersection N to the preceding node is n percent (%) of the link L3, the travel distance of the link L3 is multiplied by (n/100) to calculate the travel distance from the intersection N to the preceding node.

Figure 30A:
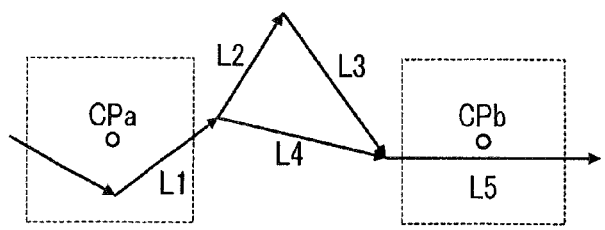
FIGS. 30A, 30B, 30C are explanatory views showing a road selection processing according to the attribute PD.
Figure 30B:
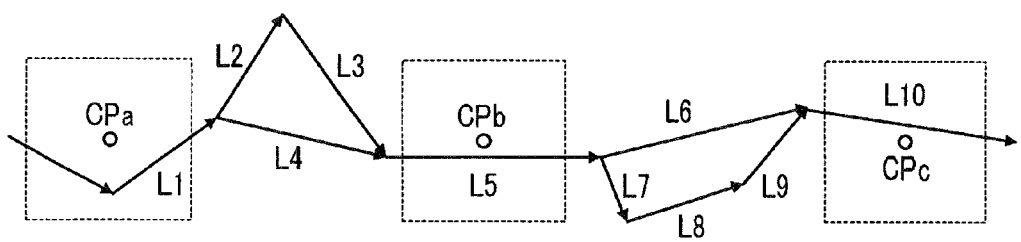
Figure 30C:
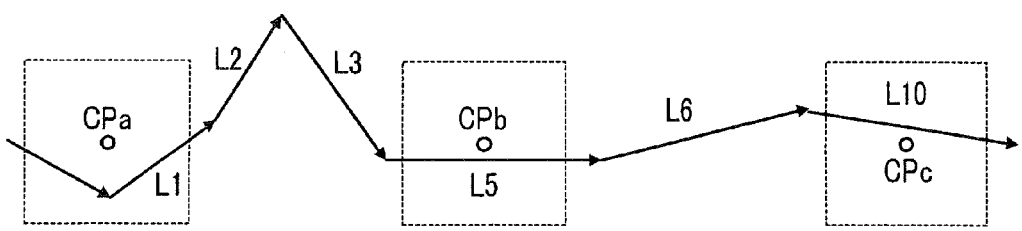

It is noted that each of the CPs do not necessarily have the attribute PD. In consideration of this, in the example shown in FIG. 30A, when the CPa has the attribute PD and when the CPb does not have the attribute PD, the candidate determination of the road is not implemented, and the road is maintained as it is. Subsequently, as shown in FIG. 30B, when the CPc has the attribute PD, the road determination is implemented for the road between the CPa and the CPc based on the attributes PD. More specifically, the NG determination is implemented for a candidate road from the link L1 through the links L2, L3, L5, L6 to the link L10 in this order, a candidate road from the link L1 through the links L4, L5, L6 to the link L10 in this order, a candidate road from the link L1 through the links L2, L3, L5, L7, L8, L9 to the link L10 in this order, and a candidate road from the link L1 through the links L4, L5, L7, L8, L9 to the link L10 in this order. In the example shown in FIG. 30C, a road from the link L1 through the links L2, L3, L5, L6, to the link L10 remains. In this case, the NG determinations are made to the road between the CPa and the CPb including the link L4 and the road between the CPb and CPc starting from the link L7 through the link L8 to the link L9.

At subsequent S424, determination is implemented according to the attribute PDM. In FIG. 4, the attribute PDM represents the spaced distance by which the object road is spaced from the straight line connected to the subsequent CP, as described above. This processing is implemented to calculate the travel distance when traveling along a way according to the attribute PDM and to determine whether the searched road is a candidate.

Specifically, the travel distance when traveling along a way is calculated based on the attribute PDM by using the subsequent formula:

PDM travel distance=½×(circumference of circle having diameter being linear distance between CPs)×correction value       (Formula 5)

Figures 31A, 31B:
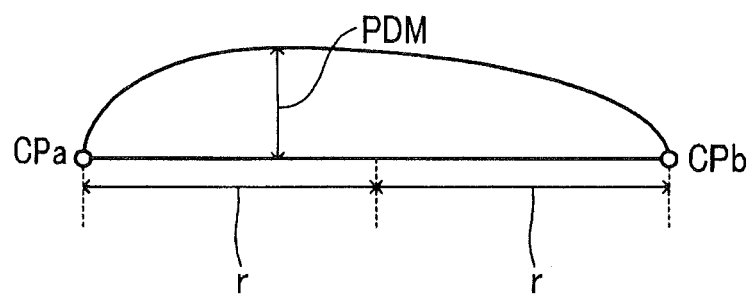
FIGS. 31A, 31B are explanatory views showing a road selection processing according to an attribute PDM.

In this processing, the correction value is found from a table according to a ratio of a half value of the linear distance between CPs to the value of the attribute PDM. Specifically, for example, in the example shown in FIG. 31A, the half value of the linear distance between the CPa and the CPb is denoted by r. In this case, the correction value corresponding to the ratio (PDM/r) is found from the table shown in FIG. 31B. The ratio (PDM/r) is the ratio of the attribute PDM to the distance r. The table shown in FIG. 31B is an exemplified portion extracted from an example table.

The travel distance along a candidate road is defined as a road travel distance. When the road travel distance satisfies a condition defined by the subsequent formula, an OK determined is made to the road:

PDM travel distance×0.5<road travel distance<PDM travel distance×1.5       (Formula 6)

<5.4.5 Output of Matching Result>

Referring to FIG. 22, at S430, a road is narrowed down according to these determination results, as described above. When a road is determined uniquely (S440: YES), a matching result is outputted at S450. The matching result includes the link IDs of all the links of the road being uniquely identified, a start-point offset distance, an end-point offset distance, and the like. The start-point offset distance represents a start position of the matching in a link including the start point of the road. Similarly, the end-point offset distance represents an end position of the matching in a link including the end point of the road.

<5.4.6 Determination of Road>

When a road is not determined uniquely (S440: NO), the road matching processing is failed. In this case, the matching result is not outputted. Otherwise, in the following cases, a road is determined uniquely.

Figure 32A:
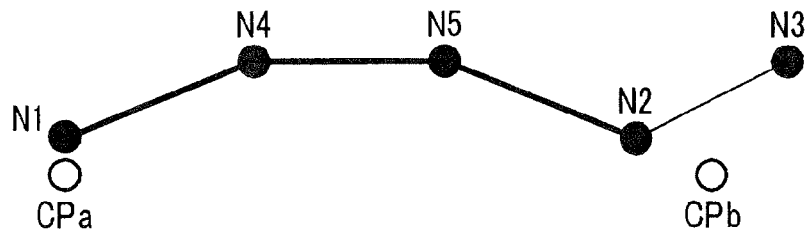
FIGS. 32A, 32B, 32C are explanatory views showing determination methods of a road.

In the example shown in FIG. 32A, it is supposed that two roads remain as a result of the road search processing for searching a road from the CPa to the CPb. One of the two is a road starting from the node N1 through the nodes N4, N5, N2 to the node N3 in this order. The other is a road starting from the node N1 through the nodes N4, N5 to the node N2 in this order. In this example, the road starting from the node N1 through the nodes N4, N5 to the node N2 represented by the thick line is included by both the two roads, and therefore, the road is determined uniquely.

Figure 32B:
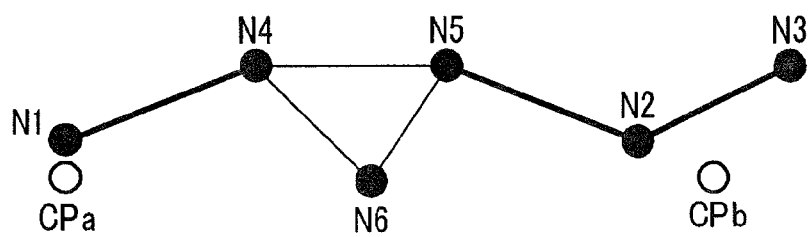

In the example shown in FIG. 32B, it is supposed that two roads remain as a result of the road search processing for searching a road from the CPa to the CPb. One of the two is a road starting from the node N1 through the nodes N4, N5, N2 to the node N3 in this order. The other is a road starting from the node N1 through the nodes N4, N6, N5, N2 to the node N3 in this order. In this example, the road starting from the node N1 to the node N4 and the road starting from the node N5 through the node N2 to the node N3 represented by the thick lines are included by both the two roads, and therefore, the roads are determined uniquely.

Figure 32C:
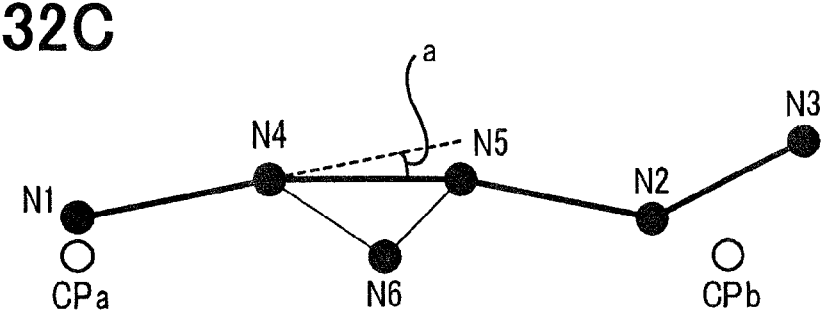

Alternatively, in the example shown in FIG. 32B, it is conceived to uniquely determine a road (along-way road) when traveling along a way. As shown in FIG. 32C, for example, the along-way road includes links at an angle denoted by the symbol a therebetween, and the angle a is less than or equal to the predetermined angle such as 15 degrees.

<6. Effect>

In the other embodiment (1), the immediately-before-crossing-boundary CP, which is located inside the boundary of the object parcel, is retrieved at S500 in FIG. 33, and the distance from the retrieved CP to the boundary of the object parcel is measured at S510. As one example, as shown in FIG. 10B, it is conceived to calculate an intersection K between a straight line, which connects the CPa with the CPb, and the boundary of the object parcel and to measure the linear distance A to the intersection K. Further, it is determined whether the distance to the immediately-before-crossing-boundary CP is greater than or equal to the predetermined distance at S520. When the distance is determined to be less than the predetermined distance (S520: NO), at S530, CPs inside the object parcel and to the immediately-before-crossing-boundary CP are set as the processing object CP. Alternatively, when the distance is determined to be greater than or equal to the predetermined distance (S520: YES), at S540, CPs to the immediately-after-crossing-boundary CP, is set as the processing object CP, in addition to the CP inside the object parcel.

That is, in the case of the CP on the end side shown in FIG. 10B, the CPa, which is inside the object parcel, is set as the CP on the end side normally at S530 in FIG. 33. In addition, when the linear distance A is greater than or equal to a predetermined value, the CPb outside the object parcel is set as the CP on the end side. In this way, the region defined by the CPa is the processing object normally, thereby to reduce the processing time as much as possible. Alternatively, when the CPa is extremely away from the boundary of the object parcel, for example, the region defined by the CPb is the processing object. Therefore, accuracy of the road estimation close to the boundary of the object parcel can be enhanced. Thus, it is possible to avoid insufficient traffic information, such as traffic congestion information.

In the other embodiment (2), the immediately-after-crossing-boundary CP, which is located outside the boundary of the object parcel, is retrieved at S600 in FIG. 34, and the distance from the retrieved CP to the boundary of the object parcel is measured at S610. As one example, as shown in FIG. 10B, it is conceived to calculate an intersection K between a straight line, which connects the CPa with the CPb, and the boundary of the object parcel and to measure the linear distance B to the intersection K. Further, it is determined whether the distance to the immediately-after-crossing-boundary CP is greater than or equal to the predetermined distance at S620. When the distance is determined to be less than the predetermined distance (S620: NO), at S630, CPs to the immediately-after-crossing-boundary CP are set as the processing object CP, in addition to the CP inside the object parcel. Alternatively, when the distance is determined to be greater than or equal to the predetermined distance (S620: YES), at S640, CPs inside the object parcel and to the immediately-before-crossing-boundary CP are set as the processing object CP.

That is, in the case of the CP on the end side shown in FIG. 10B, the CPb, which is outside the object parcel, is set as the CP on the end side normally at S630 in FIG. 34. In addition, when the linear distance B is greater than or equal to a predetermined value, the CPa inside the object parcel is set as the CP on the end side. In this way, the region defined by the CPb is the processing object normally. Therefore, accuracy of road estimation around the boundary of the object parcel can be enhanced. Thus, traffic information, such as traffic congestion information, can be sufficiently indicated. In addition, when the CPb is extremely away from the boundary of the object parcel, for example, the region defined by the CPa is the processing object. Therefore, in this case, the processing time can be reduced as much as possible.

In the other embodiment (3), the immediately-before-crossing-boundary CP and the immediately-after-crossing-boundary CP, which cross the boundary, are retrieved at S700 in FIG. 35, and the distances from the retrieved CPs to the boundary of the object parcel are measured at S710. As one example, as shown in FIG. 10B, it is conceived to calculate an intersection K between a straight line, which connects the CPa with the CPb, and the boundary of the object parcel and to measure the linear distances A, B to the intersection K. At subsequent S720, it is determined whether the distance from the immediately-after-crossing-boundary CP to the boundary is greater than the distance from the immediately-before-crossing-boundary CP to the boundary. When the distance from the immediately-after-crossing-boundary CP to the boundary is determined to be greater than the distance from the immediately-before-crossing-boundary CP to the boundary (S720: YES), at S730, CPs inside the object parcel and to the immediately-before-crossing-boundary CP are set as the processing object CP. Alternatively, when the distance from the immediately-after-crossing-boundary CP to the boundary is determined not to be greater than (i.e., less than or equal to) the distance from the immediately-before-crossing-boundary CP to the boundary (S720: NO), CPs to the immediately-after-crossing-boundary CP are set as the processing object CP, in addition to the CP inside the object parcel.

That is, in the case of the CP on the end side shown in FIG. 10B, the linear distance A is compared with the linear distance B. In this case, the CPa, which is inside the object parcel, is set as the CP on the end side when the linear distance B is greater than the linear distance A (S720: YES, S730). Otherwise, the CPb, which is outside the object parcel, is set as the CP on the end side when the linear distance B is less than the linear distance A. In this case, the CP on the end side is determined according to the linear distances A, B. When the region defined by the CPb is determined to be the processing object, accuracy of road estimation around the boundary of the object parcel can be enhanced. Thus, traffic information, such as traffic congestion information, can be sufficiently indicated. In this example, when the region defined by the CPa is otherwise determined to be the processing object, the processing time can be reduced as much as possible.

In these other embodiments, the intersection K between the straight line connecting the CPa with the CPb and the boundary of the object parcel is calculated, and the linear distance to the intersection K is measured (S510 in FIG. 33, S610 in FIG. 34, S710 in FIG. 35). In this way, it is highly possible to calculate lesser distance in dependence upon the road shape.

Furthermore, in these embodiments, it is advantageous that the processing time for assigning (S110 in FIG. 8) the virtual CP is reduced, and the processing time for recalculation (S120) of the attribute caused by the assignation of the virtual CP can be also reduced, compared with the configuration where the virtual CP is assigned.

In the present embodiment, the navigation device 10 may function as a road estimation device, the map data input device 13 may function as a map data input unit, the parcel may be equivalent to a divided region, and the object parcel may equivalent to an indicated divided region.

The CPU 17a may function as a core point selection unit and a link extraction unit. The conversion processing shown in FIGS. 33 to 35 may function as a processing of the core point selection unit. The candidate link search processing shown in FIG. 12 may function as a processing of the link extraction unit.

As described, above, the present invention is not limited to the above embodiment, and is capable of being applied to various embodiments as long as being undeviating from the gist thereof.

In the above embodiments, in the measurement of the distance to the boundary of the object parcel (S510 in FIG. 33, S610 in FIG. 34, S710 in FIG. 35), the intersection between the straight line, which connects the CPs crossing the boundary, and the boundary is obtained, and subsequently, the distance from each CP to the intersection is measured. Alternatively, the length of a perpendicular line drawn from each CP to the boundary may be measured. In this way, the distance from the boundary of the indicated divided region to the CP can be measured relatively easily.

Summarizing the above embodiment, the road estimation device is configured to receive data including multiple core points from the external object. The core points are assigned along a road. Each of the core points is assigned with an attribute for identifying the road. The road estimation device is further configured to extract links pertinent to (or coincide with) the road represented by the core points for estimating the road on the map.

In this device, the map data input unit is configured to input the map data. The map data is inputted in the unit of the divided region being one of multiple areas being divided. The map data includes the links having the attributes corresponding to the attributes of the core points.

In this device, when the core points cross the boundary of the indicated divided region, which is the divided region being the indicated object, the core point selection unit selects, as the processing object core point, a core point(s) inside the indicated divided region from the core points in the map data which the map data input unit inputs.

The link extraction unit is configured to extract candidate links being candidate of the road represented by the core points from the map data according to the attributes of the links and the attribute of the processing object core point. That is, in the present embodiment, in consideration that the map data is indicated in the unit of the divided region, only the core point(s) inside the indicated divided region, which is the divided region being the indicated object, is used as the processing object. In this way, processing time for processing core points can be reduced, compared with the case where core points outside the indicated divided region are also set as the processing object. Consequently, core points can be suitably selected as the processing object.

When a core point, which is inside the boundary of the indicated divided region and closest to the boundary, is extraordinarily away from the boundary, accuracy of road estimation around the boundary may decrease. In consideration of this, the core point selection unit may be further configured to, when the distance from the boundary of the indicated divided region to a core point located inside the boundary and closest to the boundary is greater than or equal to a predetermined distance, select, as the processing object core point, a core point(s) to the immediately-after-crossing-boundary core point, in addition to a core point(s) located inside the indicated divided region. The immediately-after-crossing-boundary core point is a core point immediately after crossing the boundary of the indicated divided region from the inside to the outside. In other words, the immediately-after-crossing-boundary core point is the first core point distributed for representing the road outside the object indicated divided region, when the road represented by the core point extends out of the object indicated divided region being the object to the indicated divided region adjacent to the object indicated divided region. That is, the immediately-after-crossing-boundary core point is the first core point in the array of the core points in the indicated divided region adjacent to the object indicated divided region. This may be applied to the following cases. Thus, accuracy of road estimation around the boundary of the indicated divided region can be enhanced in this way. Consequently, core points can be suitably selected as the processing object.

When the distance from the boundary of the indicated divided region to a core point, which is closest to the boundary and inside the boundary, is greater than or equal to a predetermined distance, the distance from the boundary to the immediately-before-crossing-boundary core point is also greater than or equal to the predetermined distance. The immediately-before-crossing-boundary core point is a core point immediately before crossing the boundary of the indicated divided region from the inside to the outside. In other words, the immediately-before-crossing-boundary core point is the last core point distributed for representing the road in the object indicated divided region, when the road represented by the core point extends out of the object indicated divided region being the object to the indicated divided region adjacent to the object indicated divided region. That is, the immediately-before-crossing-boundary core point is the last core point in the array of the core points in the object indicated divided region. This may be applied to the following cases. Therefore, the core point selection unit may be further configured to, when the distance to the immediately-before-crossing-boundary core point is greater than or equal to a predetermined distance, select, as the processing object core point, a core point(s) to the immediately-after-crossing-boundary core point. Thus, accuracy of road estimation around the boundary of the indicated divided region can be enhanced in this way. Consequently, core points can be suitably selected as the processing object.

Further, it is conceivable that the core point selection unit may be further configured to, when the distance from the boundary of the indicated divided region to the immediately-before-crossing-boundary core point is greater than or equal to a predetermined distance, select, as the processing object core point, a core point(s) to the immediately-before-crossing-boundary core point. In this way, processing time for processing a core point(s) can be restricted from becoming extremely long. Consequently, suitable selection of a core point(s) as the processing object can be enabled.

In view of enhancing accuracy of road estimation around the boundary of the indicated divided region, the core point selection unit may be further configured to, when the core points cross the boundary of the indicated divided region, which is the divided region being the indicated object, select, as the processing object core point, a core point(s) to the immediately-after-crossing-boundary core point, in addition to a core point(s) inside the indicated divided region, in the map data which the map data input unit inputs. In this way, processing time may become long, compared with the case where only a core point(s) inside the indicated divided region is set as the processing object. Nevertheless, accuracy of road estimation close to the boundary of the indicated divided region can be enhanced. Consequently, core points can be suitably selected as the processing object.

When a core point, which is outside the boundary of the indicated divided region and closest to the boundary, is extraordinarily away from the boundary, processing time for processing a core point(s) may become extraordinarily long. In consideration of this, the core point selection unit may be further configured to, when the distance from the boundary of the indicated divided region to a core point located outside the boundary and closest to the boundary is greater than or equal to a predetermined distance, select, as the processing object core point, a core point(s) inside the indicated divided region. In this way, processing time for processing a core point(s) can be restricted from becoming extremely long. Consequently, suitable selection of a core point(s) as the processing object can be enabled.

When the distance from the boundary of the indicated divided region to a core point, which is closest to the boundary and outside the boundary, is greater than or equal to a predetermined distance, the distance from the boundary to the immediately-after-crossing-boundary core point is also greater than or equal to the predetermined distance. Therefore, the core point selection unit may be further configured to, when the distance to the immediately-after-crossing-boundary core point is greater than or equal to a predetermined distance, select, as the processing object core point, a core point(s) inside the indicated divided region. In this way, processing time for processing a core point(s) can be restricted from becoming extremely long. Consequently, suitable selection of a core point(s) as the processing object can be enabled.

Further, the core point selection unit may be further configured to, when the distance from the boundary of the indicated divided region to the immediately-after-crossing-boundary core point is greater than or equal to a predetermined distance, select, as the processing object core point, a core point(s) to the immediately-before-crossing-boundary core point. Thus, accuracy of road estimation around the boundary of the indicated divided region can be enhanced in this way. Consequently, core points can be suitably selected as the processing object.

Further, the core point selection unit may be further configured to, when the core points cross the boundary of the indicated divided region, which is the divided region being the indicated object, compare the distance from the boundary to the immediately-before-crossing-boundary core point with the distance from the boundary to the immediately-after-crossing-boundary core point in the map data which the map data input unit inputs.

In this case, when the distance to the immediately-after-crossing-boundary core point is greater, a core point(s) to the immediately-before-crossing-boundary core point is selected as the processing object core point. In this way, processing time for processing a core point(s) can be restricted from becoming extremely long. Consequently, suitable selection of a core point(s) as the processing object can be enabled.

Alternatively, when the distance to the immediately-before-crossing-boundary core point is greater, a core point(s) to the immediately-after-crossing-boundary core point is selected, in addition to a core point(s) inside the indicated divided region, as the processing object core point. In this way, accuracy of road estimation around the boundary of the indicated divided region can be enhanced, and, consequently suitable selection of a core point(s) as the processing object can be enabled.

The distance from the boundary of the indicated divided region to a core point may be measured as the length of the perpendicular line drawn from the core point to the boundary. In this way, the distance from the boundary of the indicated divided region to a core point can be measured relatively easily.

In order to measure the distance close to the travel distance along the road shape, the intersection between the straight line, which connects the core points crossing the boundary, and the boundary may be obtained, and the length from the core point to the intersection may be measured. In this way, it is highly possible to calculate the distance along the road shape.

The above processings such as calculations and determinations are not limited being executed by the control unit 17. The control unit may have various structures including the control unit 17 shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A road estimation device configured to receive data including a plurality of core points as position information from an external object, the core points being assigned along a road and being respectively assigned with attributes for identifying the road, the road estimation device further configured to extract links pertinent to the road represented by the core points for estimating the road on a map, the position information being transmitted with traffic information, the road estimation device comprising:

a map data input device configured to input map data including links in a unit of a divided region being one of a plurality of divided areas, the links respectively having attributes corresponding to attributes of the core points;

a processor cooperatively operable with the map data input device, and configured to in a core point selection unit, when the core points cross a boundary of an indicated divided region, which is a divided region being an indicated object, select, as a processing object core point, a core point inside the indicated divided region from the core points in the map data which the map data input device inputs; and extract, in a link extraction unit, candidate links being a candidate of a road represented by the processing object core point from the map data according to a determination whether the attributes of the links and the attribute of the processing object core point are coincident.

2. The road estimation device according to claim 1, wherein the core point selection unit is further configured to, when a distance from the boundary of the indicated divided region to a core point located inside the boundary and closest to the boundary is greater than or equal to a predetermined distance, select, as the processing object core point, a core point to an immediately-after-crossing-boundary core point, in addition to a core point located inside the indicated divided region, wherein the immediately-after-crossing-boundary core point is a core point immediately after crossing the boundary from an inside of the indicated divided region to an outside of the indicated divided region.

3. The road estimation device according to claim 2, wherein the core point selection unit is further configured to, when a distance from the boundary of the indicated divided region to an immediately-before-crossing-boundary core point is greater than or equal to a predetermined distance, wherein the immediately-before-crossing-boundary core point is a core point immediately before crossing the boundary from the inside to the outside, select, as the processing object core point, a core point to the immediately-after-crossing-boundary core point.

4. The road estimation device according to claim 2, wherein the core point selection unit is further configured to, when a distance from the boundary of the indicated divided region to an immediately-before-crossing-boundary core point is less than a predetermined distance, wherein the immediately-before-crossing-boundary core point is a core point immediately before crossing the boundary from the inside to the outside of the indicated divided region, select, as the processing object core point, a core point to the immediately-before-crossing-boundary core point.

5. The road estimation device according to claim 2, wherein the core point selection unit is further configured to measure, as the distance from the boundary of the indicated divided region to the core point, a length of a perpendicular line drawn from the core point to the boundary.

6. The road estimation device according to claim 2, wherein the core point selection unit is further configured to measure, as the distance from the boundary of the indicated divided region to the core point, by:

obtaining an intersection being between the boundary and a straight line, which connects the immediately-after-crossing-boundary core point immediately after crossing the boundary with a core point being immediately preceding the immediately-after-crossing-boundary core point; and measuring a length from the core point to the intersection.

7. A road estimation device configured to receive data including a plurality of core points from an external object, the core points being assigned along a road and being respectively assigned with attributes for identifying the road, the road estimation device further configured to extract links pertinent to the road represented by the core points for estimating the road on a map, the road estimation device comprising:

a map data input unit configured to input map data including links in a unit of a divided region being one of a plurality of divided areas, the links respectively having attributes corresponding to attributes of the core points;

a core point selection unit configured to, when the core points cross a boundary of an indicated divided region, which is a divided region being an indicated object, select, as a processing object core point, a core point to an immediately-after-crossing-boundary core point, in addition to a core point inside the indicated divided region, from the core points in the map data which the map data input unit inputs, wherein the immediately-after-crossing-boundary core point is a core point immediately after crossing the boundary from an inside of the indicated divided region to an outside of the indicated divided region; and a link extraction unit configured to extract candidate links being candidate of a road represented by the processing object core point from the map data according to the attributes of the links and the attribute of the processing object core point.

8. The road estimation device according to claim 7, wherein the core point selection unit is further configured to, when a distance from the boundary of the indicated divided region to a core point located outside the boundary and closest to the boundary is greater than or equal to a predetermined distance, select, as the processing object core point, a core point inside the indicated divided region.

9. The road estimation device according to claim 8, wherein the core point selection unit is further configured to, when a distance from the boundary to the immediately-after-crossing-boundary core point is greater than or equal to a predetermined distance, select, as the processing object core point, a core point inside the indicated divided region.

10. The road estimation device according to claim 8, wherein the core point selection unit is further configured to, when a distance from the boundary to the immediately-after-crossing-boundary core point is less than a predetermined distance, select, as the processing object core point, a core point to the immediately-after-crossing-boundary core point.

11. The road estimation device according to claim 8, wherein the core point selection unit is further configured to measure, as the distance from the boundary of the indicated divided region to the core point, a length of a perpendicular line drawn from the core point to the boundary.

12. The road estimation device according to claim 8, wherein the core point selection unit is further configured to measure, as the distance from the boundary of the indicated divided region to the core point, by:

obtaining an intersection being between the boundary and a straight line, which connects the immediately-before-crossing-boundary core point immediately before crossing the boundary with a core point being immediately preceding the immediately-before-crossing-boundary core point; and measuring a length from the core point to the intersection.

13. A road estimation device configured to receive data including a plurality of core points from an external object, the core points being assigned along a road and being respectively assigned with attributes for identifying the road, the road estimation device further configured to extract links pertinent to the road represented by the core points for estimating the road on a map, the road estimation device comprising:
  a map data input unit configured to input map data including links in a unit of a divided region being one of a plurality of divided areas, the links respectively having attributes corresponding to attributes of the core points;
  a core point selection unit configured to,
    when the core points cross a boundary of an indicated divided region, which is a divided region being an indicated object,
      compare a distance, which is from the boundary to an immediately-after-crossing-boundary core point, with a distance, which is from the boundary to an immediately-before-crossing-boundary core point, in the map data which the map data input unit inputs,
      wherein the immediately-after-crossing-boundary core point is a core point immediately after crossing the boundary from an inside of the indicated divided region to an outside of the indicated divided region,
      wherein the immediately-before-crossing-boundary core point is a core point immediately before crossing the boundary from the inside to the outside,
    when the distance to the immediately-after-crossing-boundary core point is greater,
      select, as the processing object core point, a core point located inside the indicated divided region and to the immediately-before-crossing-boundary core point,
    when the distance to the immediately-before-crossing-boundary core point is greater,
      select, as the processing object core point, a core point to the immediately-after-crossing-boundary core point, in addition to a core point located inside the indicated divided region; and
  a link extraction unit configured to extract candidate links being candidate of a road represented by the processing object core point from the map data according to the attributes of the links and the attribute of the processing object core point.

14. The road estimation device according to claim 13, wherein the core point selection unit is further configured to measure, as the distance from the boundary of the indicated divided region to the core point, a length of a perpendicular line drawn from the core point to the boundary.

15. The road estimation device according to claim 13, wherein the core point selection unit is further configured to measure, as the distance from the boundary of the indicated divided region to the core point, by:
  obtaining an intersection being between the boundary and a straight line, which connects the immediately-before-crossing-boundary core point with the immediately-after-crossing-boundary core point crossing the boundary; and
  measuring a length from the core point to the intersection.

16. A method for estimating a road, the method comprising:
  receiving data including a plurality of core points as position information from an external object, the core points being assigned along a road and assigned respectively with attributes for identifying the road, the position information being transmitted with traffic information;
  inputting map data including links in a unit of a divided region being one of a plurality of divided areas, the links respectively having attributes corresponding to attributes of the core points;
  selecting, when the core points cross a boundary of an indicated divided region, which is a divided region being an indicated object, a processing object core point being a core point inside the indicated divided region from the core points in the inputted map data; and
  extracting candidate links being candidate of a road represented by the processing object core point from the map data according to a determination whether the attributes of the links and the attribute of the processing object core point are coincident.

17. A method for estimating a road, the method comprising:
  receiving data including a plurality of core points from an external object, the core points being assigned along a road and assigned respectively with attributes for identifying the road;
  inputting map data including links in a unit of a divided region being one of a plurality of divided areas, the links respectively having attributes corresponding to attributes of the core points;
  selecting, when the core points cross a boundary of an indicated divided region, which is a divided region being an indicated object, a processing object core point including a core point to an immediately-after-crossing-boundary core point in addition to a core point inside the indicated divided region, from the core points in the inputted map data, wherein the immediately-after-crossing-boundary core point is a core point immediately after crossing the boundary from an inside of the indicated divided region to an outside of the indicated divided region; and
  extracting candidate links being candidate of a road represented by the processing object core point from the map data according to the attributes of the links and the attribute of the processing object core point.

18. A method for estimating a road, the method comprising:
  receiving data including a plurality of core points from an external object, the core points being assigned along a road and assigned respectively with attributes for identifying the road;
  inputting map data including links in a unit of a divided region being one of a plurality of divided areas, the links respectively having attributes corresponding to attributes of the core points;
  comparing, when the core points cross a boundary of an indicated divided region, which is a divided region being an indicated object, a distance, which is from the boundary to an immediately-after-crossing-boundary core point, with a distance, which is from the boundary to an immediately-before-crossing-boundary core point, in the inputted map data,
    wherein the immediately-after-crossing-boundary core point is a core point immediately after crossing the boundary from an inside of the indicated divided region to an outside of the indicated divided region,
    wherein the immediately-before-crossing-boundary core point is a core point immediately before crossing the boundary from the inside to the outside;
  selecting, as a processing object core point, a core point located inside the indicated divided region and to the immediately-before-crossing-boundary core point, when the distance to the immediately-after-crossing-boundary core point is greater, selecting, as the processing object core point, a core point to the immediately-after-crossing-boundary core point, in addition to a core point located inside the indicated divided region, when the distance to the immediately-before-crossing-boundary core point is greater; and extracting candidate links being candidate of a road represented by the processing object core point from the map data according to the attributes of the links and the attribute of the processing object core point.

* * * * *